(12) United States Patent
Ono et al.

(10) Patent No.: US 11,268,620 B2
(45) Date of Patent: Mar. 8, 2022

(54) CHANNEL CHIP

(71) Applicant: Enplas Corporation, Saitama (JP)

(72) Inventors: Koichi Ono, Saitama (JP); Nobuya Sunaga, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/061,237

(22) Filed: Oct. 1, 2020

(65) Prior Publication Data
US 2021/0018104 A1 Jan. 21, 2021

Related U.S. Application Data

(63) Continuation of application No. 16/324,179, filed as application No. PCT/JP2017/028175 on Aug. 3, 2017, now Pat. No. 10,830,362.

(30) Foreign Application Priority Data

Aug. 8, 2016 (JP) .............................. JP2016-155851
Mar. 22, 2017 (JP) .............................. JP2017-056601

(51) Int. Cl.
*F16K 7/16* (2006.01)
*G01N 37/00* (2006.01)
(Continued)

(52) U.S. Cl.
CPC ............. *F16K 7/16* (2013.01); *B01J 19/0093* (2013.01); *B01L 3/502738* (2013.01);
(Continued)

(58) Field of Classification Search
CPC ................... F16K 7/16; F16K 99/0015; F16K 2099/0084; B01J 19/0093;
(Continued)

(56) References Cited

U.S. PATENT DOCUMENTS 2,881,958 A ‡ 4/1959 Sheen ................... F16K 11/166
222/250
2,966,928 A ‡ 1/1961 Fairchild ............... F16K 11/022
137/636.3
(Continued)

FOREIGN PATENT DOCUMENTS

EP 2775183 A2 ‡ 9/2014 ......... F16K 99/0015
EP 2775183 A2 9/2014
(Continued)

OTHER PUBLICATIONS

International Search Report from International Application No. PCT/JP2017/028175 dated Oct. 10, 2017.‡
(Continued)

*Primary Examiner* — John Bastianelli
(74) *Attorney, Agent, or Firm* — Brundidge & Stanger, P.C.

(57) ABSTRACT

A channel chip having a channel for running a fluid that is opened and closed by sliding on a film a sliding member slidable on the film while contacting with the film, the channel chip comprising: a substrate including a first channel, a second channel and a partition wall formed between the first channel and the second channel; a film including a diaphragm having a substantially spherical crown shape, the film being disposed on the substrate so that the diaphragm faces the partition wall; and a positioning section for holding the sliding member in such a way that the sliding member is slidable on the film while the positioning section positions the sliding member, the positioning section being disposed on the film.

3 Claims, 27 Drawing Sheets

(51) Int. Cl.
 *B01L 3/00* (2006.01)
 *F16K 99/00* (2006.01)
 *B01J 19/00* (2006.01)
(52) U.S. Cl.
 CPC ......... *F16K 99/0015* (2013.01); *G01N 37/00* (2013.01); *B01L 2300/0816* (2013.01); *B01L 2300/123* (2013.01); *B01L 2400/0644* (2013.01); *B01L 2400/0655* (2013.01); *F16K 2099/0084* (2013.01); *Y10T 137/87692* (2015.04)
(58) Field of Classification Search
 CPC ....... B01L 3/502738; B01L 2300/0816; B01L 2300/123; B01L 2400/0644; B01L 2400/0655; G01N 37/00; Y10T 137/87692
 USPC .................... 251/331, 335.2, 4–10; 137/607
 See application file for complete search history.

(56) References Cited

U.S. PATENT DOCUMENTS

| | | | | |
|---|---|---|---|---|
| 3,279,749 A | ‡ | 10/1966 | Fleckenstein | F16K 7/126 251/331 |
| 4,006,753 A | ‡ | 2/1977 | Ingram, Jr | F16K 31/52491 137/607 |
| 4,029,295 A | ‡ | 6/1977 | Wassmer | F16K 7/18 251/297 |
| 5,009,251 A | * | 4/1991 | Pike | A61M 5/16881 137/561 A |
| 6,505,814 B1 | ‡ | 1/2003 | Satou | F16K 7/123 251/331 |
| 2008/0302193 A1 | ‡ | 12/2008 | Bommarito | B01L 3/502738 73/864 |
| 2011/0233443 A1 | ‡ | 9/2011 | Kamada | C22C 19/055 251/33 |

FOREIGN PATENT DOCUMENTS

| | | | | | |
|---|---|---|---|---|---|
| JP | 2007-085537 A | ‡ | 4/2007 | | |
| JP | 2007-085537 A | | 4/2007 | | |
| JP | 2010-008217 A | ‡ | 1/2010 | | |
| JP | 2010-008217 A | | 1/2010 | | |
| JP | 2011-202681 A | ‡ | 10/2011 | ......... | C22C 19/056 |
| JP | 2011-202681 A | | 10/2011 | | |
| WO | 2014/123600 A2 | | 8/2014 | | |
| WO | WO-2014/123600 A2 | ‡ | 8/2014 | ......... | F16K 99/0013 |

OTHER PUBLICATIONS

Extended European Search Report from EP Application No. 17839324.5 dated Dec. 6, 2019.‡

* cited by examiner
‡ imported from a related application

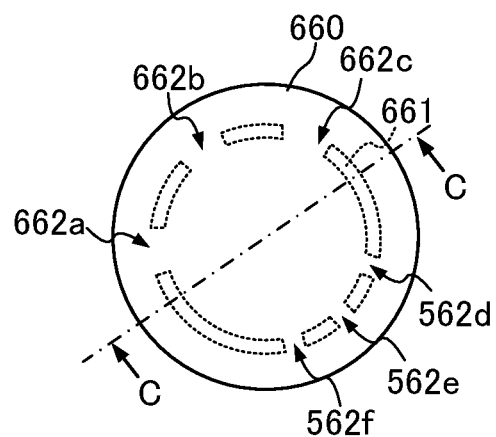
FIG. 17A
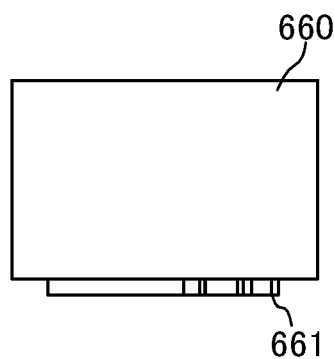 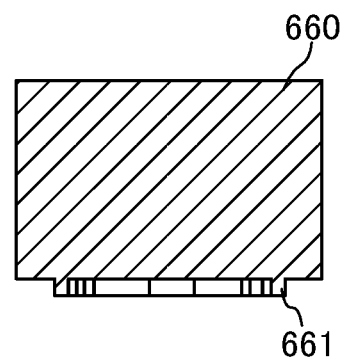
FIG. 17B  FIG. 17C

CHANNEL CHIP

CROSS REFERENCE TO RELATED APPLICATIONS

This application is a continuation of U.S. patent application Ser. No. 16/324,179, filed on Feb. 8, 2019, which is National Stage Application of International Application No. PCT/JP2017/028175, filed on Aug. 3, 2017, the disclosure of which, including the specification, drawings and abstract, is incorporated herein by reference in their entirety. International Application No. PCT/JP2017/028175 is entitled to and claims the benefit of Japanese Patent Application No. 2016-155851, filed on Aug. 8, 2016, and Japanese Patent Application No. 2017-056601, filed on Mar. 22, 2017, the disclosures of which, including the specifications, drawings and abstracts, are incorporated herein by reference in their entirety.

TECHNICAL FIELD

The present invention relates to a fluid handling device, a fluid handling method and a channel chip.

BACKGROUND ART

In recent years, fluid handling devices are used for accurately and speedily analyzing a trace amount of a substance, such as a protein or a nucleic acid. Fluid handling devices have an advantage in that only a small amount of a reagent or a sample is required for analysis, and thus are expected to be used for various applications, such as clinical examinations, food tests, and environment tests. As an example of such fluid handling devices, known is a fluid handling device that can open and close a channel thereof by using a rotary member capable of rotation (see, for example, PTL 1).

A fluid handling device described in PTL 1 includes a reaction container, a first channel connected to the reaction container at one end thereof, a sealing container, a second channel connected to the sealing container at one end thereof, a syringe for sending liquid, and a switch valve for connecting the syringe to the first or second channel. The switch valve in the fluid handling device described in PTL 1 is a rotary member that is roratable, and the rotation of the switch valve can connect the syringe to the first or second channel via a channel in the switch valve.

CITATION LIST

Patent Literature

PTL1
Japanese Patent Application Laid-Open No. 2010-008217

SUMMARY OF INVENTION

Technical Problem

In the fluid handling device described in PTL 1, the rotary member slides on a base material constituting the channel of the fluid handling device during the rotation of the rotary member, thereby wearing down the base material.

An object of the present invention is to provide a fluid handling device and a channel chip, in both of which a base material constituting a channel is not worn down by a member for opening and closing the channel when the member is operated. Another object of the present invention is to provide a fluid handling method that uses the fluid handling device.

Solution to Problem

A channel chip of the present invention is a channel chip having a channel for running a fluid that is opened and closed by sliding on a film a sliding member slidable on the film while contacting with the film. The channel chip includes: a substrate including a first channel, a second channel and a partition wall formed between the first channel and the second channel; a film including a diaphragm having a substantially spherical crown shape, the film being disposed on the substrate so that the diaphragm faces the partition wall; and a positioning section for holding the sliding member in such a way that the sliding member is slidable on the film while the positioning section positions the sliding member, the positioning section being disposed on the film.

Advantageous Effects of Invention

The present invention can provide a fluid handling device and a channel chip which can be used for long period of time as a base material constituting a channel is not worn down by a member when the member is operated for opening and closing the channel.

BRIEF DESCRIPTION OF DRAWINGS

FIGS. 17A to 17C illustrate a configuration of a rotary member according to Embodiment 6;

DESCRIPTION OF EMBODIMENTS

Embodiments of the present invention will be described in detail below with reference to the accompanying drawings.

Embodiment 1

Figure 1A:
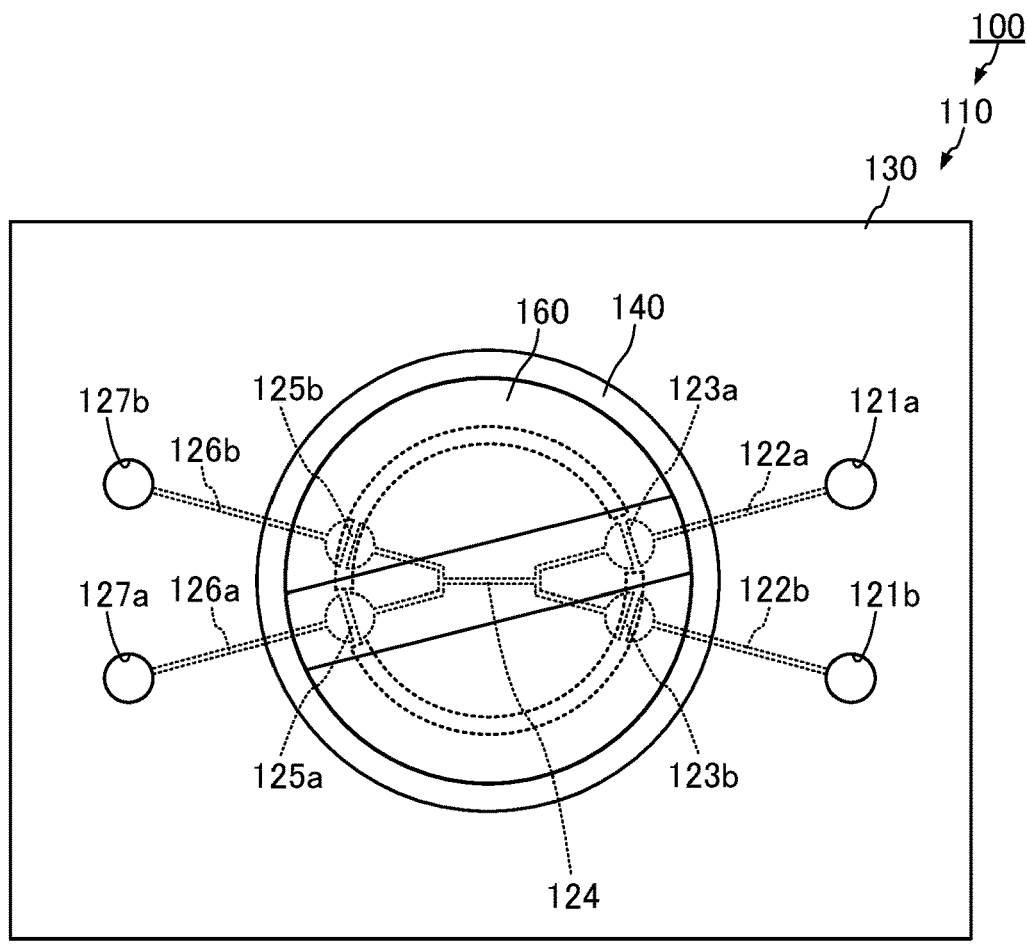
FIGS. 1A and 1B illustrate a configuration of a fluid handling device according to Embodiment 1.
Figure 1B:
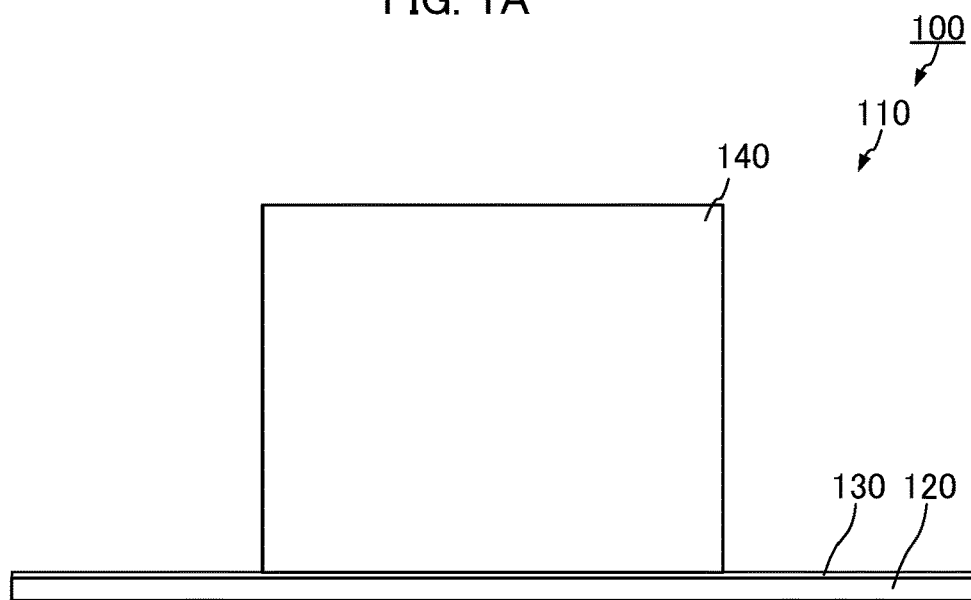

(Configuration of fluid handling device) FIGS. 1A and 1B illustrate a configuration of fluid handling device 100 according to the present embodiment. FIG. 1A is a plan view of fluid handling device 100, and FIG. 1B is a front view of fluid handling device 100.

Fluid handling device 100 according to the present embodiment includes channel chip 110 and rotary member 160. Channel chip 110 includes substrate 120, first film 130, positioning section 140 for rotary member 160 and second film 150 (see FIGS. 3A to 3C below). Channel chip 110 includes a channel for running a fluid therethrough, such as a reagent, a liquid sample or a gas. A part of first film 130 functions as a diaphragm (valve body) for opening and closing the channel.

Figure 2A:
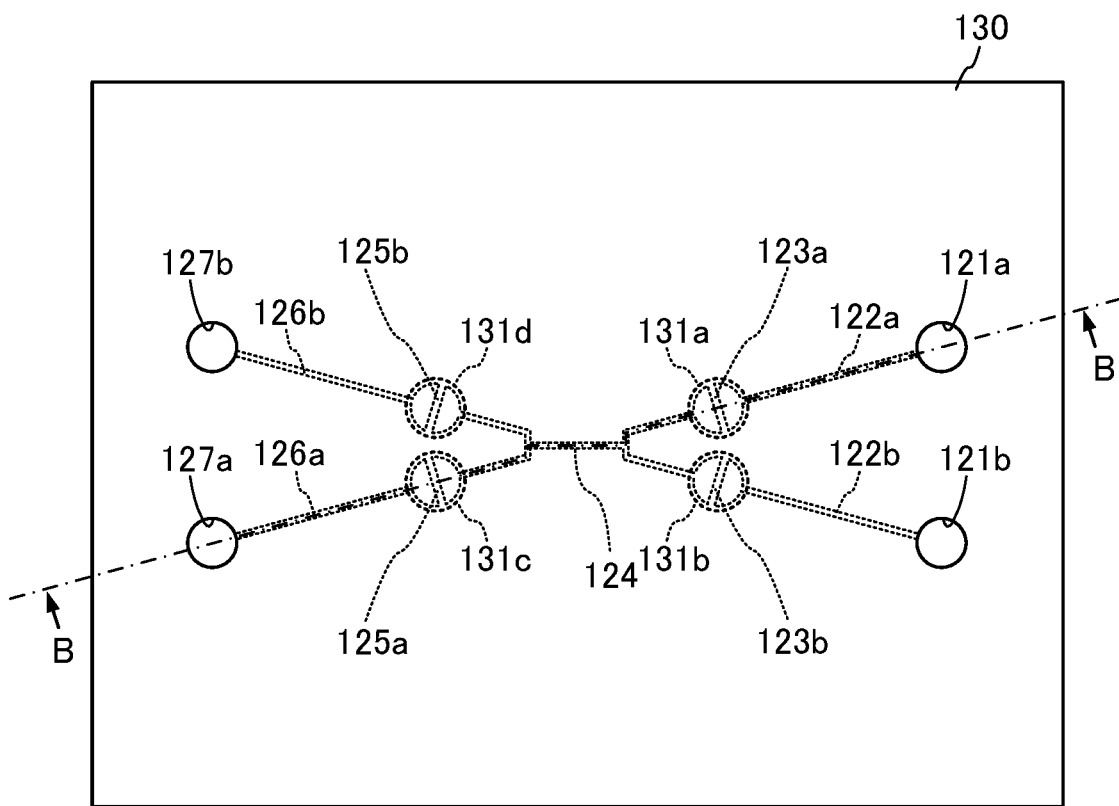
FIGS. 2A and 2B illustrate a configuration of a substrate having a first film joined thereto in Embodiment 1.
Figure 2B:
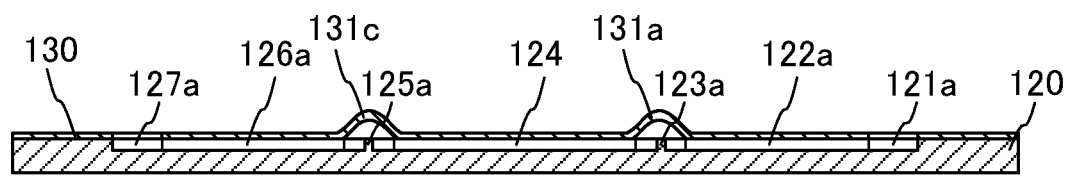

FIGS. 2A and 2B illustrate a configuration of substrate 120 having first film 130 joined thereto. FIG. 2A is a plan view of substrate 120 having first film 130 joined thereto, and FIG. 2B is a cross-sectional view taken along line B-B shown in FIG. 2A.

Channel chip 110 includes fluid inlets 121a and 121b, first channels 122a and 122b, first partition walls 123a and 123b, second channel 124, second partition walls 125a and 125b, third channels 126a and 126b, and fluid outlets 127a and 127b. Substrate 120 has a groove and/or recess formed therein as appropriate within a range that can obtain the effect of the present embodiment. Herein, a channel connected to the upstream side of each partition wall corresponds to "first channel" in the claims, and a channel connected to the downstream side of each partition wall corresponds to "second channel" in the claims.

Substrate 120 may have any thickness. For example, the thickness of substrate 120 is 1 mm or more and 10 mm or less. The material of substrate 120 may be selected from resins and glass known in the art as appropriate. Examples of the materials of substrate 120 include polyethylene terephthalate, polycarbonate, polymethylmethacrylate, polyvinyl chloride, polypropylene, polyether, polyethylene, polystyrene, silicone resins, and elastomers.

Each of fluid inlets 121a and 121b is a bottomed recess formed in substrate 120. Each of fluid inlets 121a and 121b communicates with the outside via a through hole provided in first film 130. In fluid handling device 100, fluids are introduced into channel chip 110 from fluid inlets 121a and 121b. The fluid introduced from fluid inlet 121a may be the same as or different from the fluid introduced from fluid inlet 121b.

Fluid inlets 121a and 121b may have any shapes or sizes, and may be appropriately designed as necessary. Fluid inlets 121a and 121b have, for example, a substantially cylindrical shape. The width of each of fluid inlet 121a and 121b is, for example, about 2 mm. Fluid inlet 121a and fluid inlet 121b may have the same shape and size, or different shapes and sizes. In the present embodiment, fluid inlet 121a and fluid inlet 121b have the same shape and size.

First channel 122a is a channel where a fluid introduced from fluid inlet 121a flows. Fluid inlet 121a is disposed at the upstream end of first channel 122a, and first partition wall 123a is disposed at the downstream end of first channel 122a.

First channel 122b is a channel where a fluid introduced from fluid inlet 121b flows. Fluid inlet 121b is disposed at the upstream end of first channel 122b, and first partition wall 123b is disposed at the downstream end of first channel 122b.

Each of first channels 122a and 122b is, for example, a groove whose opening is blocked with another member, such as a film. In the present embodiment, first channels 122a and 122b are formed by blocking the openings of grooves formed in substrate 120 with first film 130.

The cross-sectional areas and the cross-sectional shapes of first channels 122a and 122b are not limited. As used herein, "cross section of a channel" is a cross section of a channel orthogonal to the flow direction of a fluid. First channels 122a and 122b each have, for example, a substantially rectangular cross-sectional shape with each side (width and depth) of about several tens of micrometers. The cross-sectional areas of first channels 122a and 122b may or may not remain constant along the fluid flow direction. In the present embodiment, the cross-sectional area of first channel 122a becomes larger in a downstream-end portion thereof as the distance to the downstream end of first channel 122a become shorter. The shape of the downstream-end portion of first channel 122a in plan view may be determined in accordance with the shape of diaphragm 131a of first film 130. In the present embodiment, the end portion of first channel 122a has a semicircular shape in plan view. Because the end portion of first channel 122a has a shape in accordance with that of diaphragm 131a, diaphragm 131a deforms in accordance with the semicircular shape formed in the end portion of first channel 122a when the channel is closed by bringing diaphragm 131a into contact with first partition wall 123a. A gap thus is not formed between first film 130 and the surface of substrate 120. This prevents a liquid from seeping into a gap.

The cross-sectional area of first channel 122b and the shape of the downstream-end portion of first channel 122b in plan view may be set in the same manner as with first channel 122a, and thus the descriptions thereof are omitted. In the present embodiment, the downstream-end portion of first channel 122b also has a semicircular shape in plan view.

First channel 122a and first channel 122b may have the same cross-sectional area and cross-sectional shape, or different cross-sectional areas and cross-sectional shapes. In the present embodiment, first channel 122a and first channel 122b have the same cross-sectional area and cross-sectional shape.

First partition wall 123a is formed between the downstream end of first channel 122a and one of the upstream ends of second channel 124. First partition wall 123b is formed between the downstream end of first channel 122b and the other upstream end of second channel 124.

As will be described in detail below, each of first partition walls 123a and 123b functions as a valve seat of a microvalve for opening and closing a channel. First partition walls 123a and 123b may have any shape or height as long as the above function can be achieved. First partition walls 123a and 123b are, for example, in a shape of a quadrangular prism. The height of each of first partition wall 123a and 123b is, for example, the same as the depth of a groove formed in substrate 120 (i.e., the height of a channel). First partition wall 123a and first partition wall 123b may have the same shape and height, or different shapes and heights. In the present embodiment, first partition wall 123a and first partition wall 123b have the same shape and height.

Second channel 124 includes two upstream-end portions and two downstream-end portions. Second channel 124 is a channel where fluids coming from two first channels 122a and 122b flow. More specifically, fluids coming from two first channels 122a and 122b flow in second channel 124 via respective gaps between substrate 120 and first film 130 (i.e., a gap between first partition wall 123a and diaphragm 131a, and a gap between first partition wall 123b and diaphragm 131b).

First partition wall 123a is disposed at one of the upstream ends of second channel 124, and second partition wall 125a is disposed at one of the downstream ends of second channel 124. First partition wall 123b is disposed at the other upstream end of second channel 124, and second partition wall 125b is disposed at the other downstream end of second channel 124. Second channel 124 is, for example, a groove whose opening is blocked with another member, such as a film. In the present embodiment, second channel 124 is formed by blocking the opening of a groove formed in substrate 120 with first film 130.

The cross-sectional area and the cross-sectional shape of second channel 124 are not limited. Second channel 124 has, for example, a substantially rectangular cross-sectional shape with each side (width and depth) of about several tens of micrometers. The cross-sectional area of second channel 124 may or may not remain constant along the fluid flow direction. In the present embodiment, the cross-sectional area of second channel 124 becomes larger in a upstream-end portion thereof as the distance to the upstream end of second channel 124 become shorter, and also becomes larger in a downstream-end portion thereof as the distance to the downstream end of second channel 124 become shorter. Regarding second channel 124, the shapes of the upstream-end portions and downstream-end portions in plan view are respectively in accordance with the shapes of diaphragms 131a to 131d of first film 130. In the present embodiment, as with the downstream-end portions of first channels 122a and 122b in plan view, each of four end portions (two upstream-end portions and two downstream-end portions) of second channel 124 also has a semicircular shape in plan view.

Second partition wall 125a is formed between the downstream end of second channel 124 and the upstream end of third channel 126a. Second partition wall 125b is formed between the downstream end of second channel 124 and the upstream end of third channel 126b.

As will be described in detail below, each of second partition walls 125a and 125b also functions as a valve seat of a microvalve for opening and closing a channel. Second partition walls 125a and 125b may have any shape or height as long as the above function can be achieved. The height of each of second partition wall 125a and 125b is, for example, the same as the depth of a groove formed in substrate 120 (i.e., the height of a channel). Second partition walls 125a and 125b are, for example, in a shape of a quadrangular prism. Second partition wall 125a and second partition wall 125b may have the same shape and height, or different shapes and heights. In the present embodiment, second partition wall 125a and second partition wall 125b have the same shape and height.

Third channel 126a is a channel where a fluid coming from one of the downstream ends of second channel 124 flows. More specifically, a fluid coming from one of the downstream ends of second channel 124 via a gap between substrate 120 and first film 130 (i.e., a gap between second partition wall 125a and diaphragm 131c) flows in third channel 126a. Second partition wall 125a is disposed at the upstream end of third channel 126a, and fluid outlet 127a is disposed at the downstream end of third channel 126a.

Third channel 126b is a channel where a fluid coming from the other downstream end of second channel 124 flows. More specifically, a fluid coming from the other downstream end of second channel 124 via a gap between substrate 120 and first film 130 (i.e., a gap between second partition wall 125b and diaphragm 131d) flows in third channel 126b. Second partition wall 125b is disposed at the upstream end of third channel 126b, and fluid outlet 127b is disposed at the downstream end of third channel 126b.

Each of third channels 126a and 126b is, for example, a groove whose opening is blocked with another member, such as a film. In the present embodiment, third channels 126a and 126b are formed by blocking the openings of grooves formed in substrate 120 with first film 130.

The cross-sectional areas and the cross-sectional shapes of third channels 126a and 126b are not limited. Third channels 126a and 126b each have, for example, a substantially rectangular cross-sectional shape with each side (width and depth) of about several tens of micrometers. The cross-sectional areas of third channels 126a and 126b may or may not remain constant along the fluid flow direction. In the present embodiment, the cross-sectional area of third channel 126a becomes larger in a upstream-end portion thereof as the distance to the upstream end of third channel 126a become shorter. The shape of the upstream-end portion of third channel 126a in plan view is in accordance with the shape of diaphragm 131c of first film 130. In the present embodiment, as with the downstream-end portions of first channels 122a and 122b, the upstream-end portion of third channel 126a also has a semicircular shape in plan view.

The cross-sectional area of third channel 126b and the shape of the downstream-end portion of third channel 126b in plan view may be set in the same manner as with first channel 122a, and thus the descriptions thereof are omitted.

In the present embodiment, the upstream-end portion of third channel 126b also has a semicircular shape in plan view.

Third channel 126a and third channel 126b may have the same cross-sectional area and cross-sectional shape, or different cross-sectional areas and cross-sectional shapes. In the present embodiment, third channel 126a and third channel 126b have the same cross-sectional area and cross-sectional shape.

First channels 122a and 122b, second channel 124, and third channels 126a and 126b may have the same cross-sectional area and cross-sectional shape, or different cross-sectional areas and cross-sectional shapes. In the present embodiment, first channels 122a and 122b, second channel 124, and third channels 126a and 126b have the same cross-sectional area and cross-sectional shape.

Each of fluid outlets 127a and 127b is a bottomed recess formed in substrate 120. Each of fluid outlets 127a and 127b communicates with the outside via a through hole provided in first film 130. In fluid handling device 100, fluids are taken out from fluid outlets 127a and 127b. Fluid outlets 127a and 127b may have any shapes or sizes, and may be appropriately designed as necessary. Fluid outlets 127a and 127b have, for example, a substantially cylindrical shape. The width of each of fluid outlet 127a and 127b is, for example, about 2 mm. Fluid outlet 127a and fluid outlet 127b may have the same shape and size, or different shapes and sizes. In the present embodiment, fluid outlet 127a and fluid outlet 127b have the same shape and size.

First film 130 is a flexible film. In the present embodiment, first film 130 has four through holes formed at positions corresponding to fluid inlets 121a and 121b, and fluid outlets 127a and 127b, respectively. First film 130 also includes four diaphragms 131a to 131d each in a substantially spherical crown shape. First film 130 is disposed on substrate 120 so that diaphragm 131a faces first partition wall 123a, diaphragm 131b faces first partition wall 123b, diaphragm 131c faces second partition wall 125a, and diaphragm 131d faces second partition wall 125b.

In the present embodiment, first film 130 is disposed on substrate 120 so that diaphragms 131a to 131d each in a substantially spherical crown shape protrude away from substrate 120, and the openings of diaphragms 131a to 131d face partition walls (i.e., first partition walls 123a and 123b, and second partition walls 125a and 125b, respectively). More specifically, diaphragm 131a faces a first facing region composed of the downstream-end portion of first channel 122a, first partition wall 123a, and one of the upstream-end portions of second channel 124. Diaphragm 131b faces a second facing region composed of the downstream-end portion of first channel 122b, first partition wall 123b, and the other upstream-end portion of second channel 124. Diaphragm 131c faces a third facing region composed of one of the downstream-end portions of second channel 124, second partition wall 125a, and the upstream-end portion of third channel 126a. Diaphragm 131d faces a fourth facing region composed of the other downstream-end portion of second channel 124, second partition wall 125b, and the upstream-end portion of third channel 126b.

The center of each of diaphragms 131a to 131d may or may not be positioned above the corresponding partition wall. In the present embodiment, the center of each of diaphragms 131a to 131d is positioned above the corresponding partition wall. That is, the centers of diaphragm 131a, diaphragm 131b, diaphragm 131c and diaphragm 131d are respectively positioned above first partition wall 123a, first partition wall 123b, second partition wall 125a and second partition wall 125b.

Diaphragms 131a to 131d of first film 130 are not joined to substrate 120. Further, diaphragms 131a to 131d are bendable toward corresponding partition walls when pressed by protrusion 161a or 161b (described below) of rotary member 160.

As will be described in detail below, a channel is opened or closed by separating each of diaphragms 131a to 131d from the corresponding partition wall, or contacting the diaphragm to the partition wall. The size of each of diaphragms 131a to 131d in plan view may be appropriately set in accordance with the width of the channel, the size of the partition wall, and/or the like so that diaphragms 131a to 131d can each function as a diaphragm (valve body) of a microvalve for opening and closing the channel. Four diaphragms 131a to 131d may have the same size or different sizes. In the present embodiment, four diaphragms 131a to 131d have the same size.

The size of each of diaphragms 131a to 131d may be the same as, larger than, or smaller than that of the corresponding facing region (i.e., first facing region, second facing region, third facing region or fourth facing region). In the present embodiment, the size of each of diaphragms 131a to 131d is larger than that of the corresponding facing region (see FIG. 2A). By employing diaphragms 131a to 131d larger than the corresponding facing regions, diaphragms 131a to 131d can be suitably brought into contact with corresponding partition walls even when a gap is generated between a plane including a contact surface (namely a surface where each of diaphragms 131a to 131d contacts the corresponding partition wall), and first film 130 (see FIG. 6B below).

The distance from each of diaphragms 131a to 131d to the corresponding partition wall may be adjusted as appropriate, for example, from the view point of the flow rate of a desired fluid, and how well diaphragms 131a to 131d can adhere to the corresponding partition walls. A longer distance enables easier movement of a fluid through the gap between substrate 120 and first film 130, and a shorter distance enables easier adhesion of diaphragms 131a to 131d to the corresponding partition walls.

The material of first film 130 may be selected from resins known in the art as appropriate. Examples of the materials of first film 130 include polyethylene terephthalate, polycarbonate, polymethylmethacrylate, polyvinyl chloride, polypropylene, polyether, polyethylene, polystyrene, silicone resins, and elastomers.

Figure 3A:
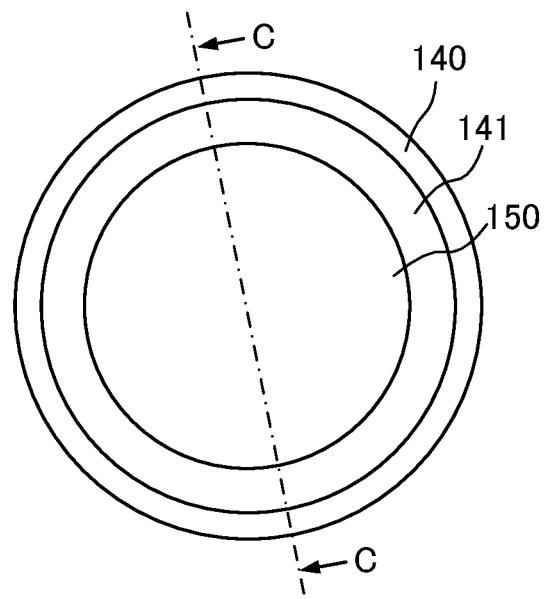
FIGS. 3A to 3C illustrate a configuration of a positioning section having a second film joined thereto in Embodiment 1.
Figure 3B:
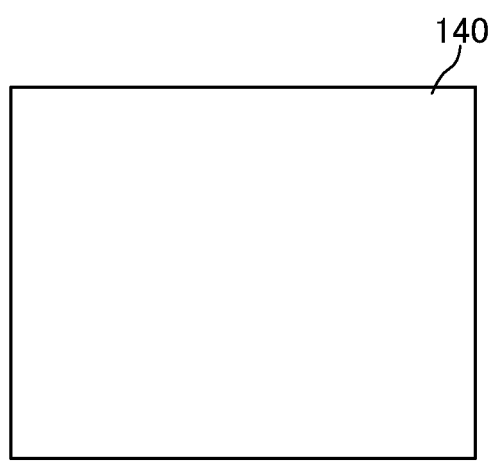
Figure 3C:
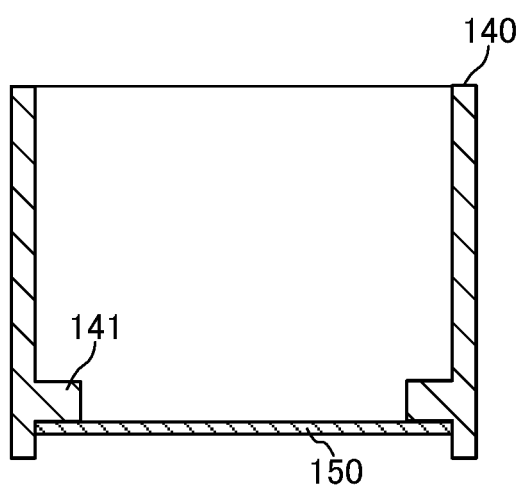
Figure 4A:
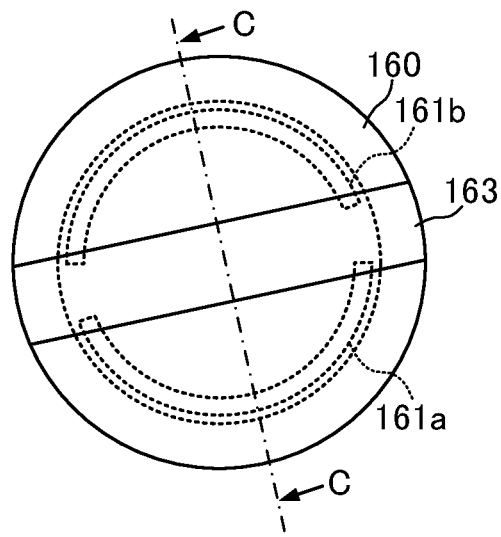
FIGS. 4A to 4C illustrate a configuration of a rotary member according to Embodiment 1.
Figure 4B:
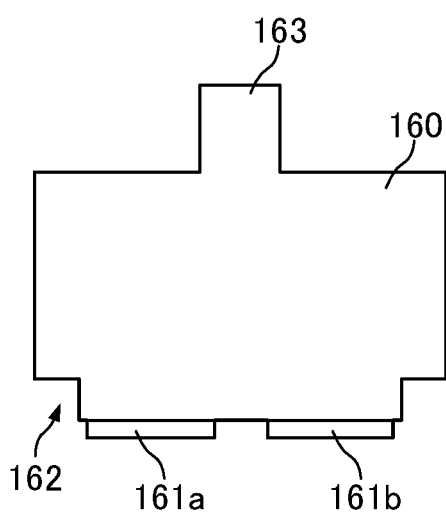
Figure 4C:
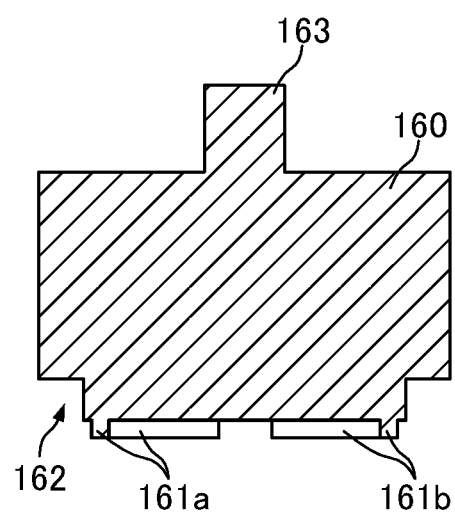

FIGS. 3A to 3C illustrate a configuration of positioning section 140 having second film 150 joined thereto. FIG. 3A is a plan view of positioning section 140 having second film 150 joined thereto, FIG. 3B is a side view thereof, and FIG. 3C is a cross-sectional view taken along line C-C in FIG. 3A. FIGS. 4A to 4C illustrate a configuration of rotary member 160. FIG. 4A is a plan view of rotary member 160, FIG. 4B is a side view thereof, and FIG. 4C is a cross-sectional view taken along line C-C in FIG. 4A.

Positioning section 140 is fixed on first film 130. Positioning section 140 holds rotary member 160 so that rotary member 160 is rotatable while positioning section 140 positions rotary member 160. Positioning section 140 may have any shape or size as long as the above function can be achieved. Positioning section 140 is, for example, a frame for rotatably holding rotary member 160, or a protrusion disposed on the rotation axis of rotary member 160. In the present embodiment, positioning section 140 is a frame including a through hole. On the inner wall of positioning section 140, step 141 for positioning rotary member 160 at a predetermined height is formed.

Positioning section 140 may be fixed to first film 130 or to substrate 120. In the present embodiment, positioning section 140 is fixed to first film 130. Any method may be employed for fixing positioning section 140 to first film 130, and for example, positioning section 140 may be bond to first film 130.

Second film 150 is a flexible film. Second film 150 is immovably disposed between first film 130 and rotary member 160. In the present embodiment, second film 150 is joined to positioning section 140 to be disposed between first film 130 and rotary member 160 so that second film 150 does not rotate.

The material of second film 150 may be selected from resins and rubber known in the art as appropriate Examples of the materials of second film 150 include polyethylene terephthalate, polycarbonate, polymethylmethacrylate, polyvinyl chloride, polypropylene, polyether, polyethylene, polystyrene, silicone resins, and elastomers. For increasing the slidability between second film 150 and rotary member 160, polyethylene is preferred as the material of second film 150. For increasing the slidability between second film 150 and rotary member 160, coating treatment that increases slidability may also be performed on the surface of second film 150. In addition, for easier closing of the gaps between diaphragms 131*a* to 131*d* and the respective partition walls (i.e., first partition walls 123*a* and 123*b*, and second partition walls 125*a* and 125*b*), a rubber film is preferred as the material of second film 150.

Rotary member 160 is disposed, with its underside facing first film 130, on first film 130. In the present embodiment, rotary member 160 is disposed in a frame, namely positioning section 140. Rotary member 160 is thus positioned to be rotatable by positioning section 140 at a predetermined position on first film 130. In the present embodiment, notch 162 whose shape corresponds to that of step 141 of positioning section 140 is formed on the underside of rotary member 160. Rotary member 160 may further include handle 163 for rotating rotary member 160. Handle 163 may have any shape, such as a shape of a quadrangular prism.

In the present embodiment, two protrusions 161*a* and 161*b* are formed on the underside of rotary member 160. Rotary member 160 can rotate about the normal line of the underside. As will be described in detail below, the rotation of rotary member 160 opens or closes a channel. In the present embodiment, rotary member 160 can alternately switch between below-described first state and second state (select the first state or second state), by the rotation thereof.

Rotary member 160 has a certain level of weight and rigidity for pressing diaphragms 131*a* to 131*d* by protrusions 161*a* and 161*b* to adhere each of diaphragms 131*a* to 131*d* to the corresponding partition wall. Any material may be selected for rotary member 160 from materials known in the art as appropriate. Examples of the materials of rotary member 160 include resins, rubber and metals. For increasing the slidability of rotary member 160 relative to positioning section 140 and second film 150, polyethylene is preferred as the material of rotary member 160, for example. In addition, coating treatment that increases slidability of rotary member 160 to positioning section 140 and second film 150 may also be performed on the surface of rotary member 160.

In the present embodiment, in a first state, a fluid introduced into channel chip 110 from fluid inlet 121*a* can flow to fluid outlet 127*a* via first channel 122*a*, second channel 124 and third channel 126*a*. In the first state, two protrusions 161*a* and 161*b* are disposed so that neither of the two protrusions faces first partition wall 123*a* with diaphragm 131*a* therebetween, and neither of the two protrusions faces second partition wall 125*a* with diaphragm 131*c* therebetween. In the first state, first channel 122*a* communicates with second channel 124 via the gap between diaphragm 131*a* and first partition wall 123*a*, and second channel 124 communicates with third channel 126*a* via the gap between diaphragm 131*c* and second partition wall 125*a*.

On the other hand, in the first state, two protrusions 161*a* and 161*b* are disposed so that one of the two protrusions faces first partition wall 123*b* with diaphragm 131*b* therebetween, and the other one of the two protrusions faces second partition wall 125*b* with diaphragm 131*d* therebetween. Accordingly, diaphragm 131*b* is pressed by one of protrusions 161*a* and 161*b* to come into contact with first partition wall 123*b*, and diaphragm 131*d* is pressed by the other one of protrusions 161*a* and 161*b* to come into contact with second partition wall 125*b*. In the first state, first channel 122*b* does not communicate with second channel 124, and second channel 124 does not communicate with third channel 126*b*.

In the present embodiment, in a second state, a fluid introduced into channel chip 110 from fluid inlet 121*b* can flow to fluid outlet 127*b* via first channel 122*b*, second channel 124 and third channel 126*b*. In the second state, two protrusions 161*a* and 161*b* are disposed so that one of the two protrusions faces first partition wall 123*a* with diaphragm 131*a* therebetween, and the other one of the two protrusions faces second partition wall 125*a* with diaphragm 131*c* therebetween. Accordingly, diaphragm 131*a* is pressed by one of protrusions 161*a* and 161*b* to come into contact with first partition wall 123*a*, and diaphragm 131*c* is pressed by the other one of protrusions 161*a* and 161*b* to come into contact with second partition wall 125*a*. In the second state, first channel 122*a* does not communicate with second channel 124, and second channel 124 does not communicate with third channel 126*a*.

On the other hand, in the second state, two protrusions 161*a* and 161*b* are disposed so that neither of the two protrusions faces first partition wall 123*b* with diaphragm 131*b* therebetween, and neither of the two protrusions faces second partition wall 125*b* with diaphragm 131*d* therebetween. Accordingly, first channel 122*b* communicates with second channel 124 via the gap between diaphragm 131*b* and first partition wall 123*b*, and second channel 124 communicates with third channel 126*b* via the gap between diaphragm 131*d* and second partition wall 125*b*.

The shape, number and size of protrusions 161*a* and 161*b* are not limited as long as the above function can be achieved. As used herein, "protrusion" is a part of the underside of rotary member 160, and the part can press diaphragms 131*a* to 131*d* so that the diaphragms come into contact with the partition walls. Protrusions 161*a* and 161*b* may be a protruding part formed on the underside of rotary member 160, or when a recess is formed in the underside of rotary member 160, a part other than the recess. In the present embodiment, two protrusions 161*a* and 161*b* are projected lines extending along the rotation direction of rotary member 160. Two protrusions 161*a* and 161*b* are separated from each other. The distance between two protrusions 161*a* and 161*b* in the circumferential direction of rotary member 160 is, for example, the same as or larger than the size of each of diaphragms 131*a* to 131*d* in plan view.

Fluid handling device 100 can be produced by, for example, fixing positioning section 140 having second film 150 joined thereto, on substrate 120 having first film 130 joined thereto, followed by disposing rotary member 160 in positioning section 140. Any method may be selected from methods known in the art as appropriate for fixing substrate 120 and first film 130 to each other, and second film 150 and positioning section 140 to each other. For example, substrate 120 and first film 130 can be joined to each other by thermal welding, laser welding, the use of an adhesive agent, or the like. Second film 150 and positioning section 140 can also be joined to each other by thermal welding, laser welding, the use of an adhesive agent, or the like. Any method may also be selected from methods known in the art as appropriate for fixing substrate 120 (first film 130) and positioning section 140 (second film 140) to each other. For example, first film 130 and positioning section 140 can be joined to each other by thermal welding, laser welding, the use of an adhesive agent, or the like. Alternatively, positioning section 140 may be fit on substrate 120 (first film 130) via fitting structures provided on substrate 120 and positioning section 140.

(Fluid Handling Method)

Figure 5A:
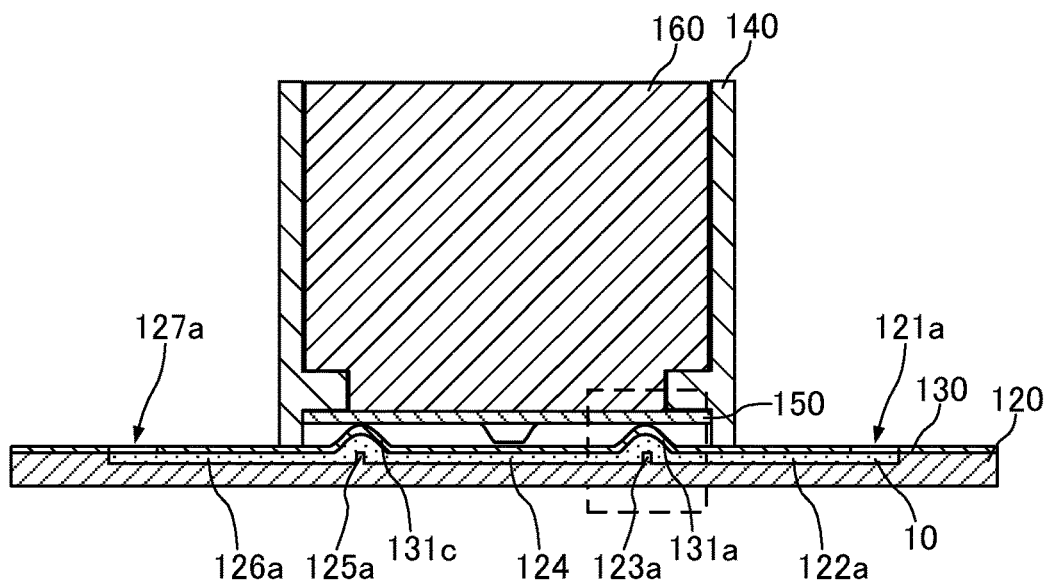
FIGS. 5A and 5B are diagrams for describing a fluid handling method according to Embodiment 1.
Figure 5B:
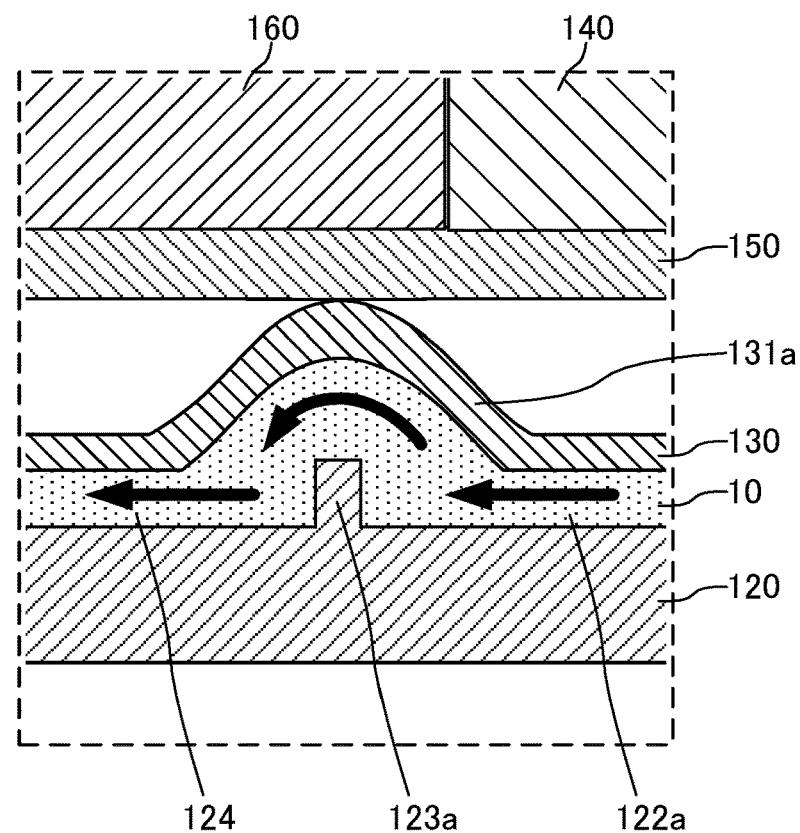
Figure 6A:
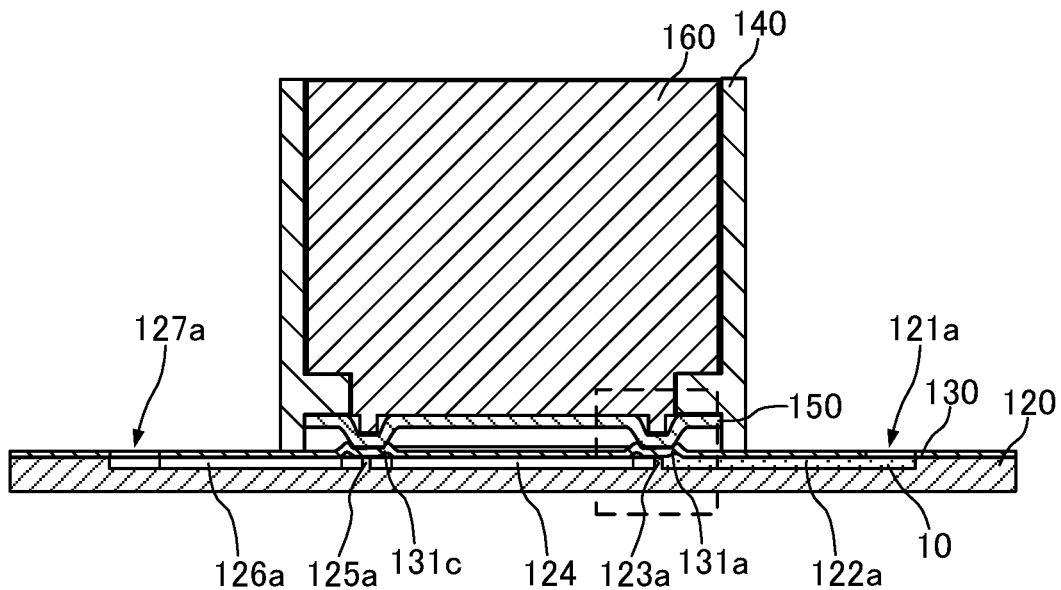
FIGS. 6A and 6B are diagrams for describing the fluid handling method according to Embodiment 1.
Figure 6B:
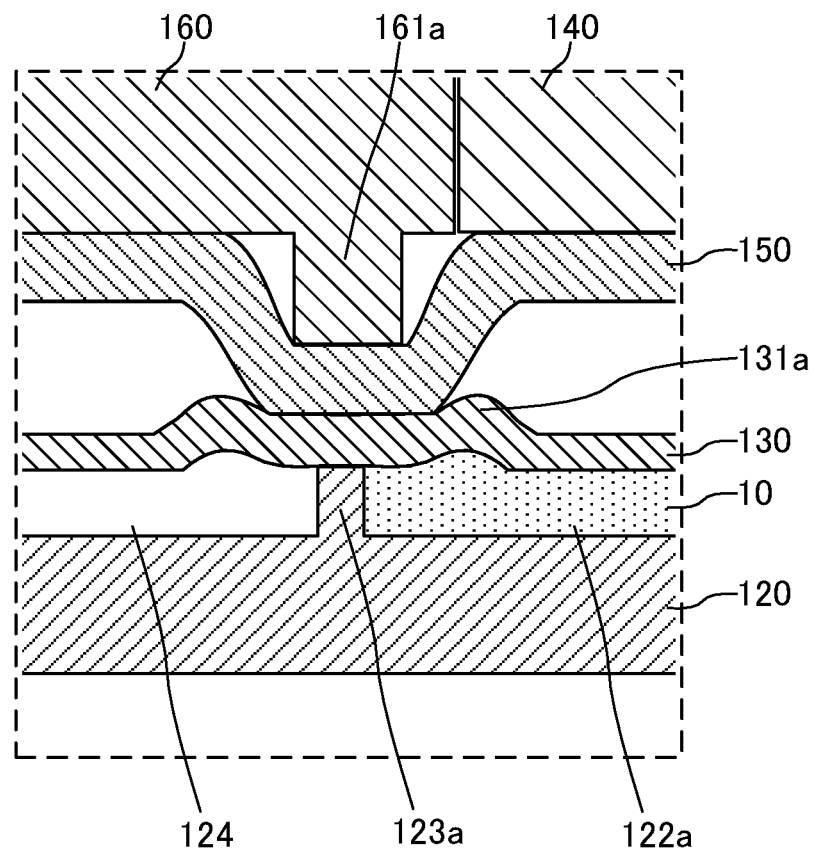

Hereinafter, described is an example of a method for handling a fluid by using fluid handling device 100 according to the present embodiment. FIGS. 5A, 5B, 6A and 6B are diagrams for describing the fluid handling method according to the present embodiment. FIGS. 5A and 5B are cross-sectional views of fluid handling device 100 in the first state, and FIGS. 6A and 6B are cross-sectional views of fluid handling device 100 in the second state. FIG. 5B is a partially enlarged sectional view of a region surrounded by the broken line in FIG. 5A, and FIG. 6B is a partially enlarged sectional view of a region surrounded by the broken line in FIG. 6A.

The fluid handling method according to the present embodiment includes a step of switching to (selecting) the first state, and a step of switching to (selecting) the second state.

Rotary member 160 is rotated for switching to the first state. Fluid 10, such as a reagent or a liquid sample is then provided to fluid inlets 121a and 121b and introduced into first channels 122a and 122b. In the first state, gaps are formed (valve opened state) for allowing the fluid to move therethrough between diaphragm 131a and first partition wall 123a, and between diaphragm 131c and second partition wall 125a, respectively. At the same time, diaphragm 131b is pressed by one of protrusions 161a and 161b to come into contact with first partition wall 123b, and diaphragm 131d is pressed by the other one of protrusions 161a and 161b to come into contact with second partition wall 125b. Accordingly, no gap is formed between diaphragm 131b and first partition wall 123b, and between diaphragm 131d and second partition wall 125b (valve closed state).

Therefore, in the first state, fluid 10 introduced into channel chip 110 from fluid inlet 121a is moved by capillarity or outside pressure from first channel 122a to second channel 124, then from second channel 124 to third channel 126a, via the respective gaps between substrate 120 and first film 130 to reach fluid outlet 127a. In this instance, fluid 10 cannot move through between diaphragm 131b or first partition wall 123b, and between diaphragm 131d and second partition wall 125b. Fluid 10 introduced into channel chip 110 from fluid inlet 121b thus cannot move from first channel 122b to second channel 124.

Subsequently, rotary member 160 is rotated for switching to the second state. Accordingly, gaps are formed between diaphragm 131b and first partition wall 123b, and between diaphragm 131d and second partition wall 125b, respectively (valve opened state). At the same time, diaphragm 131a is pressed to come into contact with first partition wall 123a, and diaphragm 131c is pressed to come into contact with second partition wall 125a. Accordingly, no gap is formed between diaphragm 131a and first partition wall 123a, and between diaphragm 131c and second partition wall 125a (valve closed state).

Therefore, in the second state, fluid 10 introduced into channel chip 110 from fluid inlet 121a cannot move from first channel 122a to second channel 124, or from second channel 124 to third channel 126a. On the other hand, fluid 10 introduced into channel chip 110 from fluid inlet 121b moves from first channel 122b to second channel 124, then from second channel 124 to third channel 126b to reach fluid outlet 127b, via the respective gaps between substrate 120 and first film 130.

As described above, switching from the first state to the second state enables both closing of a channel that connects fluid inlet 121a and fluid outlet 127a, and opening of a channel that connects fluid inlet 121b to fluid outlet 127b. As a result, the flow of fluid 10 introduced into channel chip 110 from fluid inlet 121a is stopped. In the fluid handling method described in the present embodiment, the first state is switched to the second state, but the second state may be switched to the first state.

In addition, in channel chip 110 according to the present embodiment, the channel connecting fluid inlet 121a and fluid outlet 127a shares second channel 124 with the channel connecting fluid inlet 121b and fluid outlet 127b. Accordingly, a predetermined amount of fluid (i.e., fluid introduced from fluid inlet 121a) remaining in second channel 124 can be mixed with a fluid introduced from fluid inlet 121b when the first state is switched to the second state.

(Effect)

Single motion, namely the rotation of rotary member 160 can open and close a channel in fluid handling device 100 according to the present embodiment. In fluid handling device 100 according to the present embodiment, first film 130 is disposed between rotary member 160 and a base material (substrate 120) constituting a channel of channel chip 110. Therefore, the rotating operation of rotary member 160 for opening and closing the channel does not cause wearing down of the base material constituting the channel, which could have occurred due to the sliding of rotary member 160 during the rotation thereof.

In addition, in a fluid handling device described in the conventional art, a fluid moves through a channel in a rotary member, and thus a foreign substance, which may be generated by the sliding of the rotary member during the rotation thereof, possibly contaminates the fluid in the channel. In fluid handling device 100 according to the present embodiment, meanwhile, rotary member 160 rotates within positioning section 140 (frame) whose opening is blocked with second film 150. As a foreign substance that may be generated by the sliding does not go outside the frame, namely positioning section 140, the foreign substance does not contaminate a fluid in the channel.

Further, channel chip 110 of fluid handling device 100 according to the present embodiment includes second film 150. Therefore, first film 130 that is another member constituting a channel is not worn down, either.

The above embodiment describes a mode including second film 150; however, fluid handling device 100 and channel chip 110 according to the present invention are not limited to the mode. For example, channel chip 110 does not necessarily include second film 150. In this case, polyethylene is preferred as the material of first film 130 for increasing the slidability between first film 130 and rotary member 160. For increasing the slidability between first film 130 and rotary member 160, coating treatment that increases slidability may also be performed on the surface of first film 130.

Fluid handling device 100 (and also channel chip 110) may have second film 150 made of rubber disposed on first film 130, and a third film made of polyethylene on second film 150. Using second film 150 made of rubber enables easier adherence of diaphragms 131a to 131d with the respective partition walls (i.e., first partition walls 123a and 123b and second partition walls 125a and 125b) when protrusions 161a and 161b presses two of diaphragms 131a to 131d toward the partition walls. Gaps between diaphragms 131a to 131d and partition walls can be thus closed more easily. Further, the third film made of polyethylene enables easier rotation of rotary member 160.

The above embodiment describes a mode in which fluid handling device 100 includes positioning section 140; however, a fluid handling device according to the present invention does not necessarily include positioning section 140 as long as rotary member 160 can rotate at a predetermined position.

Further, the above embodiment describes a mode that controls the opening and closing of a channel by the rotation of rotary member 160; however, the present invention is not limited to the mode. For example, a sliding member which has a protrusion formed thereon and is slidable on first film 130 is slid straightly on first film 130 that is disposed on substrate 120, thereby controlling the opening and closing of a channel. In this case, the sliding member is slid back and forth on first film 130 to bring a diaphragm into contact with a partition wall by pressing the diaphragm with the protrusion, or separate the diaphragm from the partition wall, thereby switching between the first state and second state. A positioning section in this case holds the sliding member in such a way that the sliding member can be slid straightly while the positioning section positions the sliding member.

Embodiment 2

(Configuration of Fluid Handling Device)

Figure 7A:
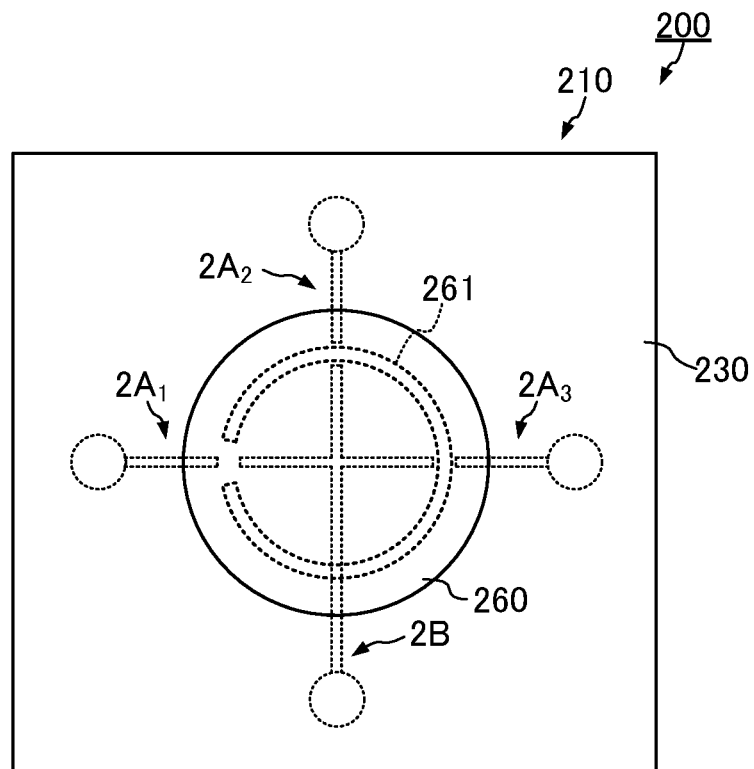
FIGS. 7A and 7B illustrate a configuration of a fluid handling device according to Embodiment 2.
Figure 7B:
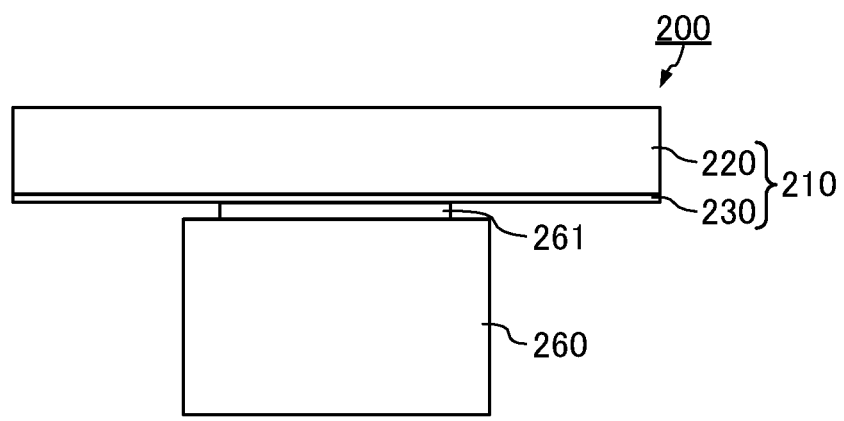
Figure 8A:
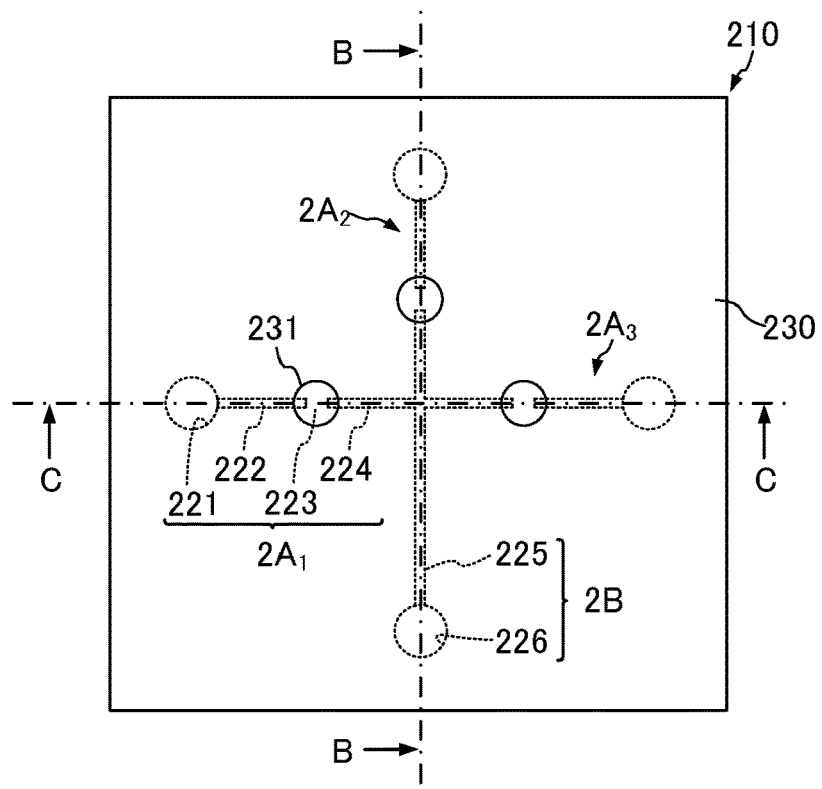
FIGS. 8A to 8C illustrate a configuration of a channel chip according to Embodiment 2.
Figure 8B:
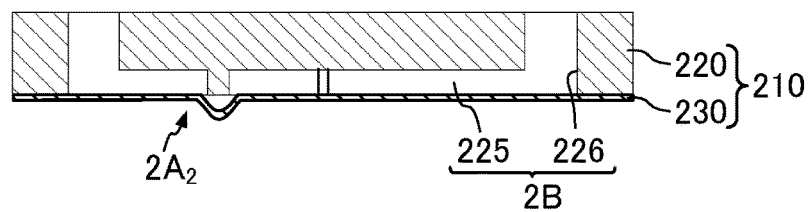
Figure 8C:
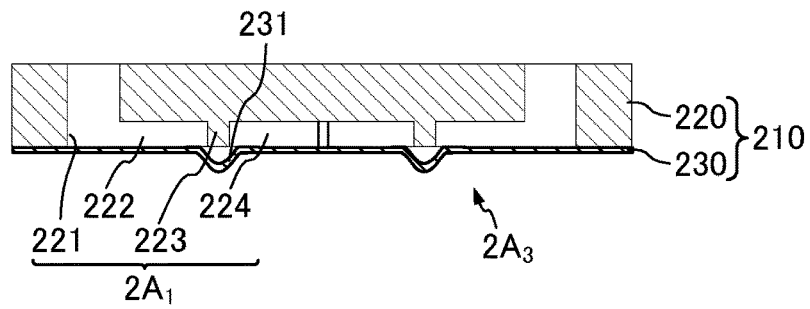
Figure 9A:
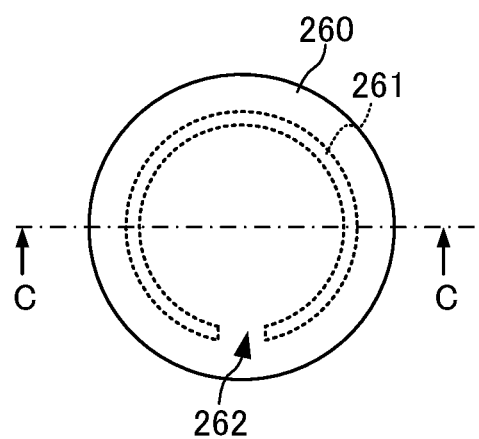
FIGS. 9A to 9C illustrate a configuration of a rotary member according to Embodiment 2.
Figure 9B:
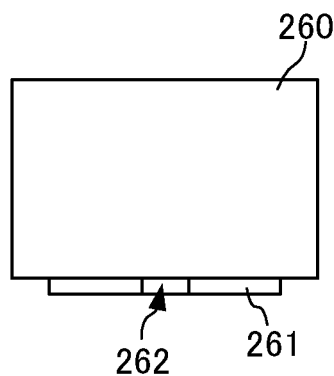
Figure 9C:
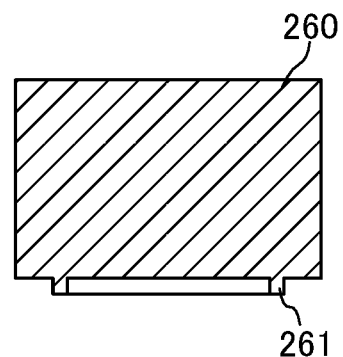

FIGS. 7A and 7B illustrate a configuration of fluid handling device 200 according to Embodiment 2. FIG. 7A is a bottom view of fluid handling device 200, and FIG. 7B is a front view thereof. FIGS. 8A to 8C illustrate a configuration of channel chip 210 according to Embodiment 2. FIG. 8A is a bottom view of channel chip 210, FIG. 8B is a cross-sectional view taken along line B-B in FIG. 8A, and FIG. 8C is a cross-sectional view taken along line C-C in FIG. 8A. FIGS. 9A to 9C illustrate a configuration of rotary member 260 according to Embodiment 2. FIG. 9A is a plan view of rotary member 260, FIG. 9B is a front view thereof, and FIG. 9C is a cross-sectional view taken along line C-C in FIG. 9A.

As illustrated in FIGS. 7A and 7B, fluid handling device 200 according to Embodiment 2 includes channel chip 210 and rotary member 260. Channel chip 210 includes substrate 220 and film 230.

Substrate 220 has a groove and/or through hole formed therein as appropriate within a range that can obtain the effect of the present embodiment. The thickness and example materials of substrate 220 are the same as those of substrate 120 according to Embodiment 1.

In the present embodiment, film 230 includes three diaphragms 231. Film 230 is the same as first film 130 in Embodiment 1 except for the number and positions of diaphragms 231. Diaphragms 231 are, except for the positions thereof in film 230, the same as diaphragms 131a to 131d in Embodiment 1.

Channel chip 210 includes channels for running a fluid therethrough, such as a reagent, liquid sample, gas or powder. More specifically, channel chip 210 includes three first channel units $2A_1$ to $2A_3$ and one second channel unit 2B. Three first channel units $2A_1$ to $2A_3$ have identical configurations except for the positions of the channel units in channel chip 210. Therefore, only first channel unit $2A_1$ is described in the following.

First channel unit $2A_1$ includes first housing portion 221, first channel 222, partition wall 223 and second channel 224.

First housing portion 221 is a bottomed recess for housing a fluid. In the present embodiment, first housing portion 221 is composed of a through hole formed in substrate 220, and film 230 blocking one of the openings of the through hole. The shape and size of first housing portion 221 are the same as those of fluid inlet 121a in Embodiment 1, respectively.

A fluid to be housed in first housing portion 221 may be changed as appropriate in accordance with the use of fluid handling device 200. The fluid may be a reagent, liquid sample, powder or the like.

First channel 222 allows a fluid to move therein. The upstream end of first channel 222 is connected to first housing portion 221. At the downstream end of first channel 222, partition wall 223 is disposed. In the present embodiment, first channel 222 is composed of a groove formed in substrate 220, and film 230 blocking the opening of the groove. The cross-sectional area and cross-sectional shape of first channel 222 are the same as those of first channel 122a in Embodiment 1, respectively.

Partition wall 223 is formed between the downstream end of first channel 222 and the upstream end of second channel 224. Partition wall 223 functions as a valve seat of a microvalve for opening and closing a channel. The shape and height of partition wall 223 are the same as those of first partition wall 123a in Embodiment 1, respectively.

Second channel 224 allows a fluid to move therein. At the upstream end of second channel 224, partition wall 223 is disposed. The downstream end of second channel 224 is connected to the upstream end of third channel 225 (described below) of second channel unit 2B. In the present embodiment, second channel 224 is composed of a groove formed in substrate 220, and film 230 blocking the opening of the groove. The cross-sectional area and cross-sectional shape of second channel 224 are the same as those of first channel 122a in Embodiment 1, respectively.

Second channel unit 2B includes third channel 225 and second housing portion 226.

Third channel 225 allows a fluid to move therein. The upstream end of third channel 225 is connected to the downstream ends of three second channels 224 in respective first channel units $2A_1$ to $2A_3$. The downstream end of third channel 225 is connected to second housing portion 226. In the present embodiment, third channel 225 is composed of a groove formed in substrate 220, and film 230 blocking the opening of the groove. The cross-sectional area and cross-sectional shape of third channel 225 are the same as those of first channel 122a according to Embodiment 1, respectively.

Second housing portion 226 is a bottomed recess for housing a fluid. In the present embodiment, second housing portion 226 is composed of a through hole formed in substrate 220, and film 230 blocking one of the openings of the through hole. The shape and size of second housing portion 226 are the same as those of fluid outlet 127a in Embodiment 1, respectively.

A fluid to be housed in second housing portion 226 may be changed as appropriate in accordance with the use of fluid handling device 200. For example, second housing portion 226 may be used as a chamber for mixing fluids coming from first housing portions 221 in three first channel units $2A_1$ to $2A_3$, respectively. In this case, the size of second housing portion 226 is preferably sufficient to accommodate the volume of the housing fluids coming from first housing portions 221 in first channel units $2A_1$ to $2A_3$.

Rotary member 260 is the same as rotary member 160 in Embodiment 1 except that notch 162 or handle 163 is not formed in rotary member 260, and the shape of protrusion 261 formed on the underside of rotary member 260 is different. Rotary member 260 may be held by a positioning section for positioning rotary member 260 so that rotary member 260 can rotate.

As illustrated in FIGS. 9A to 9C, protrusion 261 is formed on the underside of rotary member 260 in the present embodiment. Protrusion 261 is a projected line extending along the rotation direction of rotary member 260. Protrusion 261 includes one notch 262. The length of notch 262 in the circumferential direction of rotary member 260 is, for example, the same as or larger than the size of diaphragm 231 in plan view. In the present embodiment, the length of notch 262 is about the same as the size of diaphragm 231.

Fluid handling device 200 according to the present embodiment includes three microvalves. The microvalves are respectively composed of partition walls 223 in first channel units $2A_1$ to $2A_3$ and corresponding diaphragms 231. In fluid handling device 200, each microvalve switches between a first state and second state. In the first state, protrusion 261 is positioned so as not to face partition wall 223 with diaphragm 231 therebetween, and in the second state, protrusion 261 is positioned so as to face partition wall 223 with diaphragm 231 therebetween. In other words, notch 262 of rotary member 260 is positioned so as to face partition wall 223 with diaphragm 231 therebetween in the first state.

Fluid handling device 200 is produced in the same manner as the fluid handling device according to Embodiment 1 except that positioning section 140 is fixed to the substrate. For example, fluid handling device 200 may be produced by disposing rotary member 260 on substrate 220 having film 230 joined thereto at a desired position so that film 230 faces the underside of rotary member 260.

(Fluid Handling Method)

Hereinafter, described is an example of a method for handling a fluid by using fluid handling device 200 according to Embodiment 2 (fluid handling method according to Embodiment 2). In the present embodiment, a method is described in which a fluid each coming from first housing portions 221 of respective three first channel units $2A_1$ to $2A_3$ is moved to second housing portion 226 and mixed.

Predetermined fluids are previously housed in first housing portions 221 of first channel units $2A_1$ to $2A_3$, respectively. Rotary member 260 is then rotated for switching the microvalve in first channel unit $2A_1$ to the first state (valve opened state). In this instance, the microvalves in respective first channel units $2A_2$ and $2A_3$ are in the second state (valve closed state). Accordingly, first channel 222 communicates with second channel 224 in first channel unit $2A_1$, and first channel 222 does not communicate with second channel 224 in each of first channel units $2A_2$ and $2A_3$. A fluid in first housing portion 221 of first channel unit $2A_1$ is thus moved by outside pressure or the like from first channel 222, to a gap between diaphragm 231 and partition wall 223, to second channel 224, and then to third channel 225 to reach second housing portion 226.

Subsequently, rotary member 260 is further rotated to open the microvalve in first channel unit $2A_2$ and the microvalve in first channel unit $2A_3$ one at a time. This can move fluids in first housing portions 221 of first channel units $2A_2$ and $2A_3$, respectively, to second housing portion 226 in the same manner as the movement of a liquid from first housing portion 221 of first channel unit $2A_1$ to second housing portion 226. The fluids coming from respective first housing portions 221 of first channel units $2A_1$ to $2A_3$ thus can be mixed and reacted in second housing portion 226.

In fluid handling device 200 as described above, the rotation of rotary member 260 enables suitable movement of fluids by switching between the first state and the second state.

(Effect)

Channel chip 210, fluid handling device 200 and the fluid handling method according to Embodiment 2 have the effects the same as in Embodiment 1.

In addition, for mixing a plurality of fluids, it is necessary in some cases for a conventional fluid handling method to move the plurality of fluids using an external device or to move a channel chip. The fluid handling method according to the present embodiment, on the other hand, can mix a plurality of fluids by single motion, namely the rotation of rotary member 260. In the present embodiment, as it is not necessary to move a fluid using an external device, the fluid can be handled easily and highly efficiently, and further, because it is not necessary to move a channel chip, no liquid leakage occurs.

Embodiment 3

Figure 10A:
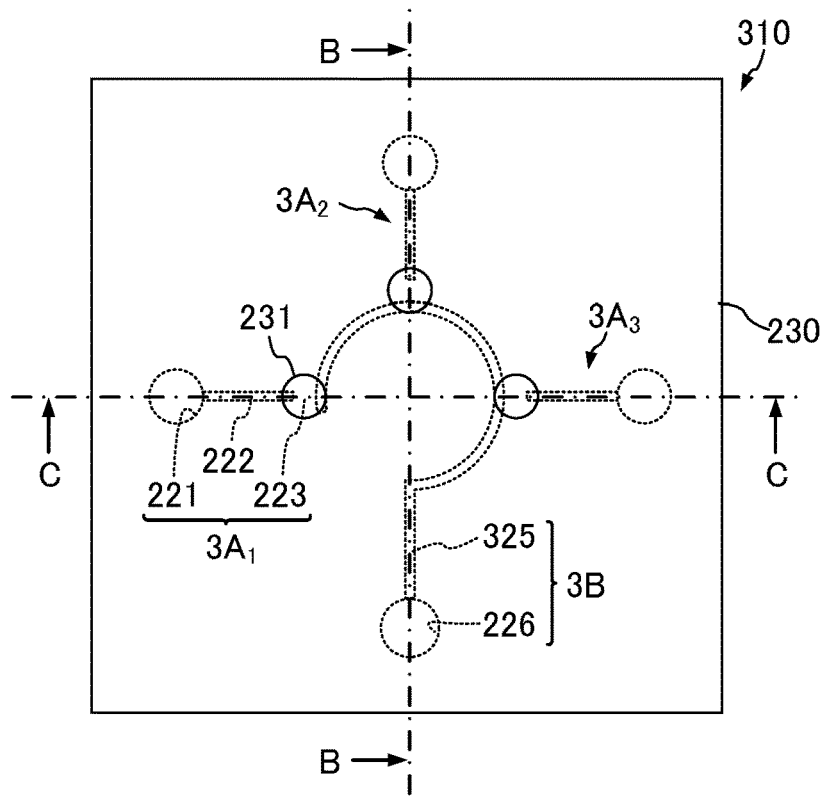
FIGS. 10A to 10C illustrate a configuration of a channel chip according to Embodiment 3.
Figure 10B:
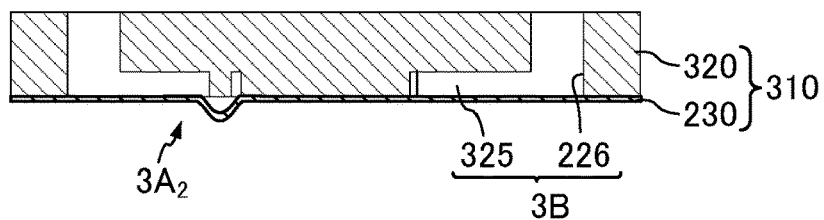
Figure 10C:
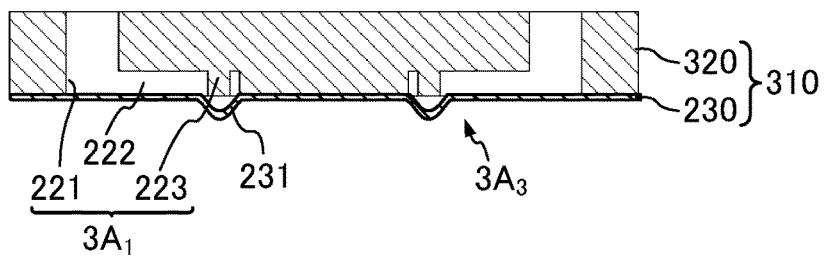

FIGS. 10A to 10C illustrate a configuration of channel chip 310 according to Embodiment 3. FIG. 10A is a bottom view of channel chip 310, FIG. 10B is a cross-sectional view taken along line B-B in FIG. 10A, and FIG. 10C is a cross-sectional view taken along line C-C in FIG. 10A.

A fluid handling device according to Embodiment 3 includes channel chip 310 and rotary member 260. The fluid handling device according to Embodiment 3 is the same as fluid handling device 200 according to Embodiment 2 except for a configuration of liquid chip 310. Therefore, the same reference numerals are given to the components the same as those of fluid handling device 200 according to Embodiment 2, and the descriptions thereof will be omitted.

Channel chip 310 includes substrate 320 and first film 230. Substrate 320 has a groove and/or through hole formed therein as appropriate within a range that can obtain the effect of the present embodiment. The thickness and example materials of substrate 320 are the same as those of substrate 120 according to Embodiment 1.

Channel chip 310 includes channels for running a fluid therethrough, such as a reagent, liquid sample, gas or powder. More specifically, channel chip 310 includes three first channel units $3A_1$ to $3A_3$ and one second channel unit 3B.

First channel units $3A_1$ to $3A_3$ each include first housing portion 221, first channel 222 and partition wall 223. Second channel unit 3B includes third channel 325 and second housing portion 226.

Second channel unit 3B is the same as second channel unit 2B in Embodiment 2 except that the shape of third channel 325 is different from that of third channel 225. Specifically, third channel 325 of second channel unit 3B extends in such a way that when channel chip 310 is viewed from the bottom, third channel 325 links three partition walls 223 in respective first channel units $3A_1$ to $3A_3$ and second housing portion 226 in second channel unit 3B in sequence. In the present embodiment, third channel 325 extends in such a way that a portion thereof extending in the shape of an arc links three partition walls 223 of respective first channel units $3A_1$ to $3A_3$, and another portion thereof extending straight is connected to second housing portion 226 at its end.

In channel chip 310, diaphragm 231 faces a facing region composed of a downstream-end portion of first channel 222, partition wall 223 and a part of third channel 325.

The fluid handling device according to Embodiment 3 may be used in the same manner as fluid handling device 200 according to Embodiment 2. In the fluid handling device according to Embodiment 3, the rotation of rotary member 260 also enables suitable movement of fluids by switching between the first state and the second state.

In addition, in channel chip 310, a fluid coming from first housing portion 221 moves to second housing portion 226 through first channel 222, the gap between diaphragm 231 and partition wall 223, and third channel 325. Therefore, when a cleaning fluid moves as the fluid from first housing portion 221 of first channel unit $3A_1$ to second housing portion 226, the cleaning fluid can move through the entire channel positioned downstream of partition wall 223 (i.e., third channel 325). This enables cleaning of the entire channel positioned downstream of partition wall 223 by a single cleaning operation in channel chip 310.

(Effect)

Channel chip 310, the fluid handling device and the fluid handling method according to Embodiment 3 have the effects the same as in Embodiment 1. In addition, a single cleaning operation can clean the entire channel positioned downstream of partition wall 223 in Embodiment 3.

Embodiment 4

Figure 11A:
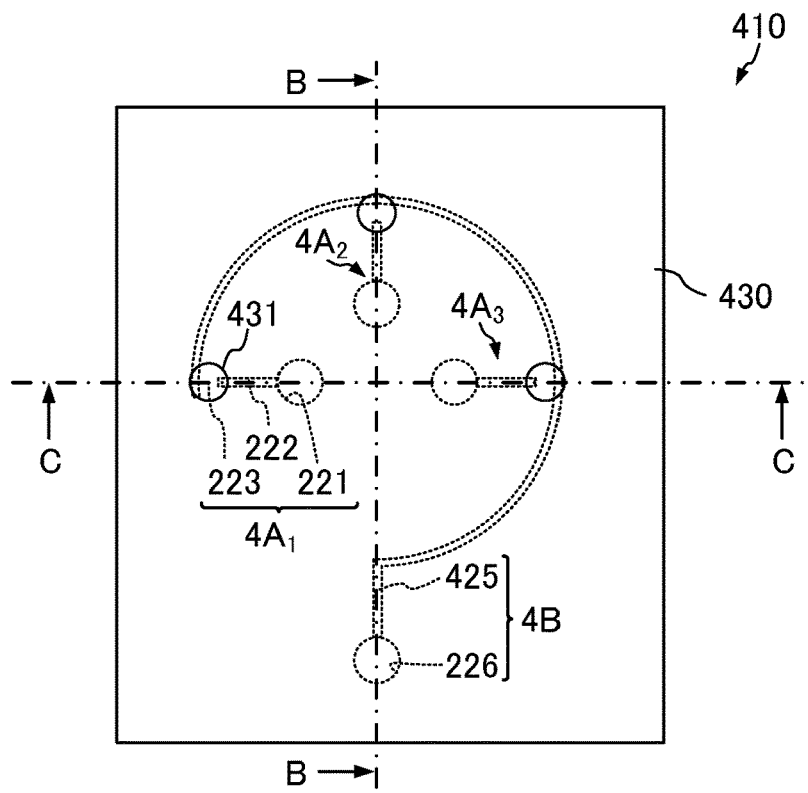
FIGS. 11A to 11C illustrate a configuration of a channel chip according to Embodiment 4.
Figure 11B:
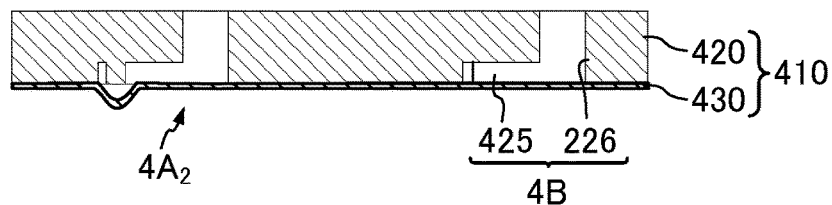
Figure 11C:
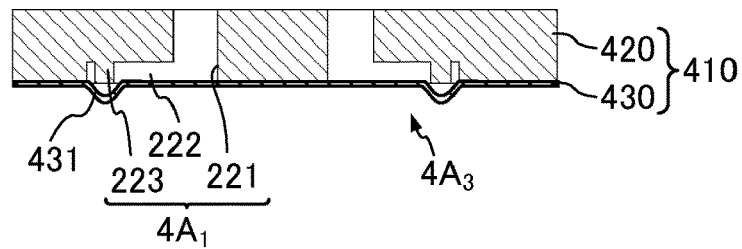

FIGS. 11A to 11C illustrate a configuration of channel chip 410 according to Embodiment 4. FIG. 11A is a bottom view of channel chip 410, FIG. 11B is a cross-sectional view taken along line B-B in FIG. 11A, and FIG. 11C is a cross-sectional view taken along line C-C in FIG. 11A.

A fluid handling device according to Embodiment 4 includes channel chip 410 and rotary member 260. The fluid handling device according to Embodiment 4 is the same as the fluid handling device according to Embodiment 3 except for a configuration of liquid chip 410. Therefore, the same reference numerals are given to the components the same as those of the fluid handling device according to Embodiment 3, and the descriptions thereof will be omitted.

Channel chip 410 includes substrate 420 and film 430. Substrate 420 has a groove and/or through hole formed therein as appropriate within a range that can obtain the effect of the present embodiment. The thickness and example materials of substrate 420 are the same as those of substrate 120 according to Embodiment 1.

Film 430 includes three diaphragms 431. Film 430 is the same as film 230 in Embodiment 2 except for the positions of diaphragms 431. Diaphragms 431 are, except for the positions thereof in film 430, the same as diaphragms 131a to 131d in Embodiment 1.

Channel chip 410 includes channels for running a fluid therethrough, such as a reagent, liquid sample, gas or powder. More specifically, channel chip 410 includes three first channel units $4A_1$ to $4A_3$ and one second channel unit 4B.

First channel units $4A_1$ to $4A_3$ are the same as first channel units $3A_1$ to $3A_3$ in Embodiment 3 except for the positions of first housing portions 221, first channels 222 and partition walls 223.

Second channel unit 4B is the same as second channel unit 3B in Embodiment 3 except that the shape of third channel 425 is different from that of third channel 325. Specifically, third channel 425 is disposed in such a way that when channel chip 410 is viewed from the bottom, third channel 425 does not cross a part (hereinafter also referred to as "slide part") where protrusion 261 of rotary member 260 slides on first film 430. In Embodiment 4, third channel 425 is disposed in such a way that when channel chip 410 is viewed from the bottom, third channel 425 is positioned outside the slide part.

The fluid handling device according to Embodiment 4 may be used in the same manner as the fluid handling device according to Embodiment 3. In the fluid handling device according to Embodiment 4, the rotation of rotary member 260 also enables suitable movement of fluids by switching between the first state and the second state.

(Effect)

Channel chip 410, the fluid handling device and the fluid handling method according to Embodiment 4 have the effects the same as in Embodiment 3. In addition, in Embodiment 4, third channel 425 is disposed in such a way that when channel chip 410 is viewed from the bottom, third channel 425 does not cross the slide part where protrusion 261 of rotary member 260 slides on first film 430. This prevents protrusion 261 of rotary member 260 from pressing first film 430 on third channel 425.

Embodiment 5

(Configuration of Fluid Handling Device)

Figure 12A:
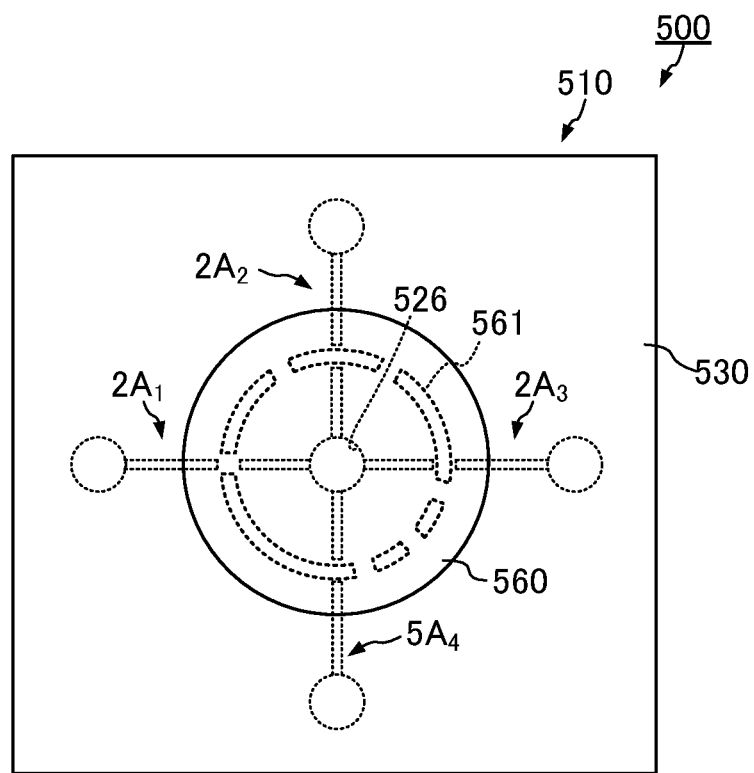
FIGS. 12A and 12B illustrate a configuration of a fluid handling device according to Embodiment 5.
Figure 12B:
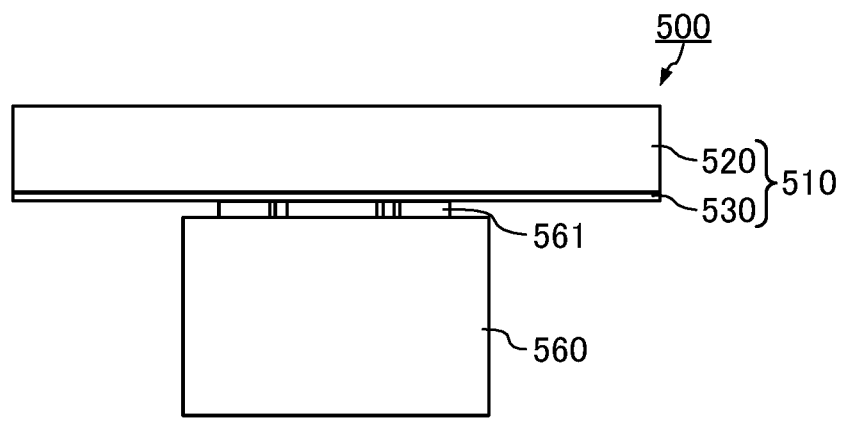
Figure 13A:
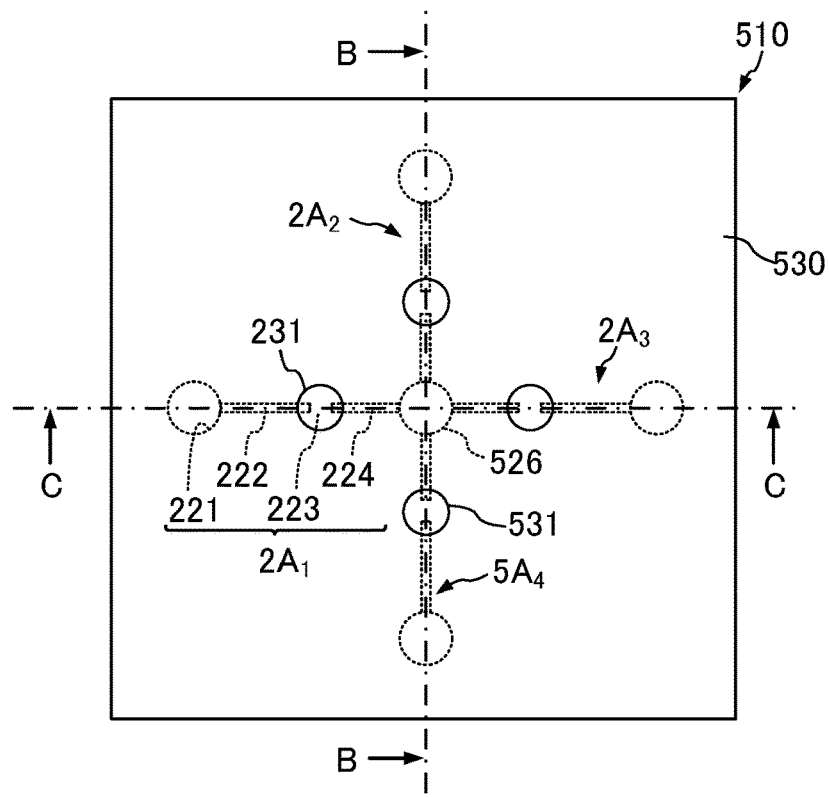
FIGS. 13A to 13C illustrate a configuration of a channel chip according to Embodiment 5.
Figure 13B:
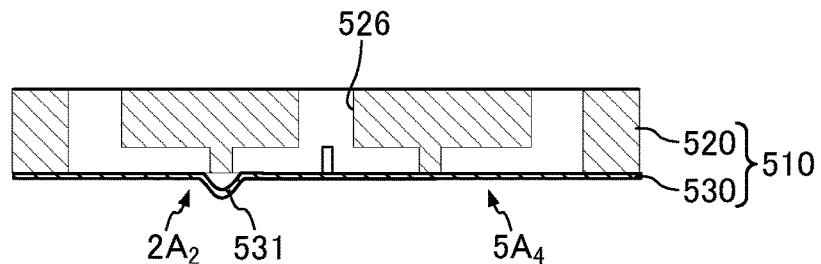
Figure 13C:
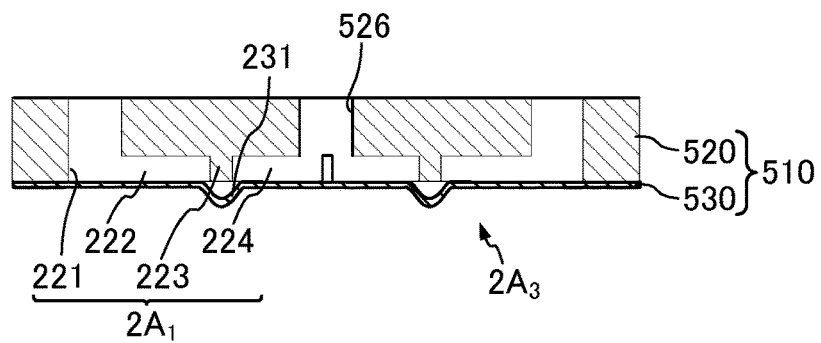
Figure 14A:
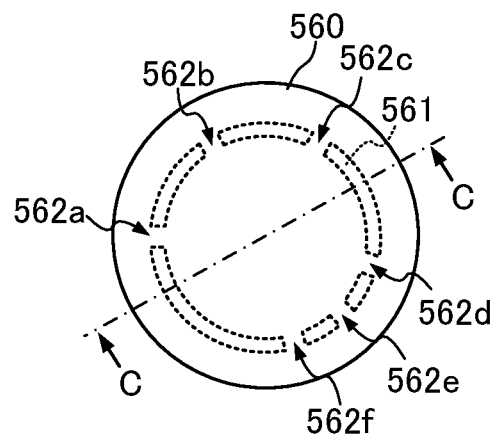
FIGS. 14A to 14C illustrate a configuration of a rotary member according to Embodiment 5.
Figure 14B:
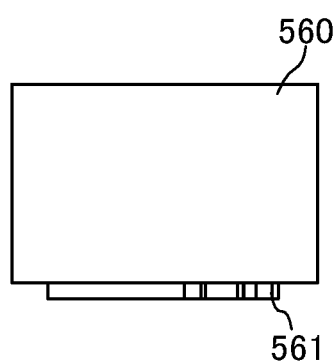
Figure 14C:
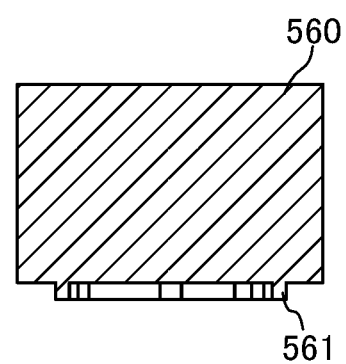

FIGS. 12A and 12B illustrate a configuration of fluid handling device 500 according to Embodiment 5. FIG. 12A is a bottom view of fluid handling device 500, and FIG. 12B is a front view thereof. FIGS. 13A to 13C illustrate a configuration of channel chip 510 according to Embodiment 5. FIG. 13A is a bottom view of channel chip 510, FIG. 13B is a cross-sectional view taken along line B-B in FIG. 13A, and FIG. 13C is a cross-sectional view taken along line C-C in FIG. 13A. FIGS. 14A to 14C illustrate a configuration of rotary member 560 according to Embodiment 5. FIG. 14A is a plan view of rotary member 560, FIG. 14B is a front view thereof, and FIG. 14C is a cross-sectional view taken along line C-C in FIG. 14A.

Fluid handling device 500 according to Embodiment 5 includes channel chip 510 and rotary member 560. Some of the components of fluid handling device 500 according to Embodiment 5 are the same as those of fluid handling device 200 according to Embodiment 2. Therefore, the same reference numerals are given to the components the same as those of the fluid handling device according to Embodiment 2, and the descriptions thereof will be omitted.

Channel chip 510 includes substrate 520 and film 530. Substrate 520 has a groove and/or through hole formed therein as appropriate within a range that can obtain the effect of the present embodiment. The thickness and example materials of substrate 520 are the same as those of substrate 120 according to Embodiment 1.

Film 530 includes three diaphragms 231 and one diaphragm 531. Film 530 is the same as film 230 in Embodiment 2 except for the number of diaphragms 231 and 531. Diaphragm 531 is disposed above partition wall 223 of first channel unit $5A_4$. Diaphragms 531 is, except for the position thereof on film 530, the same as diaphragms 131a to 131d in Embodiment 1.

Channel chip 510 includes channels for running a fluid therethrough, such as a reagent, liquid sample, gas or powder. More specifically, channel chip 510 includes four first channel units $2A_1$ to $2A_3$ and $5A_4$, and second housing portion 526. Channel chip 510 is the same as channel chip 210 according to Embodiment 2 except that channel chip 510 includes first channel unit $5A_4$ in place of second channel unit 2B, and the position of second housing portion 526 is different from that of second housing portion 226.

In Embodiment 5, second housing portion 526 is disposed at the downstream-end portions (junction) of second channels 224 in respective four first channel units $2A_1$ to $2A_3$ and $5A_4$. Second housing portion 526 is the same as second housing portion 226 in Embodiment 2 except for the position thereof in channel chip 510.

Rotary member 560 is the same as rotary member 260 in Embodiment 2 except that the shape of protrusion 561 formed on the underside of rotary member 560 is different from that of protrusion 261. Protrusion 561 is a projected line extending along the rotation direction of rotary member 560. Protrusion 561 includes plurality of notches. The number and positions of the notches can be adjusted as appropriate in accordance with the configuration, such as the number and positions of partition walls 223, of fluid handling device 500.

As illustrated in FIG. 14A, protrusion 561 includes six notches 562a to 562f in the present embodiment. The positions of six notches 562a to 562f may be determined in such a way that a motion process in fluid handling device 500 is terminated when rotary member 560 is rotated at a predetermined angle (for example, 90°) in one direction.

There is an assumption that when rotary member 560 is viewed from the bottom, a point where the bottom surface of rotary member 560 and the rotation axis thereof intersect is a center, and the position of notch 562a is a reference position (central angle 0°). In the present embodiment, notches 562b, 562c, 562d, 562e and 562f are disposed at positions corresponding to central angles 60°, 120°, 195°, 225°, and 255°, respectively.

The length of each of notches 562a to 562f in the circumferential direction of rotary member 560 is, for example, the same as or larger than the size of each of diaphragms 231 and 531 in plan view. Notches 562a to 562f may have the same length or different lengths. In the present embodiment, notches 562a to 562f have identical lengths that are about the same as the size of diaphragms 231 and 531.

(Fluid Handling Method)

Hereinafter, described is an example of a method for handling a fluid by using fluid handling device 500 according to Embodiment 5 (fluid handling method according to Embodiment 5). In the present embodiment, a method is described in which a reaction liquid is moved from each of first housing portions 221 in respective three first channel units $2A_1$ to $2A_3$ to second housing portion 526 for a desired reaction, and every time after the reaction liquid is moved, a cleaning fluid is moved from first housing portion 221 of first channel unit $5A_4$ to second housing portion 526 for cleaning second housing portion 526. Accordingly, the reaction and cleaning are alternately performed in the present embodiment.

FIGS. 15A to 15F are schematic views of the bottom surface of fluid handling device 500 for describing respective steps in a fluid handling method according to Embodiment 5. As illustrated in FIGS. 15A to 15F, the fluid handling method according to the present embodiment includes first to sixth steps.

(First Step)

Predetermined reaction liquids are previously stored in first housing portions 221 of first channel units $2A_1$ to $2A_3$, respectively, and a cleaning fluid in first housing portion 221 of first channel unit $5A_4$. Rotary member 560 is then rotated for switching the microvalve in first channel unit $2A_1$ to the first state (valve opened state; see FIG. 15A). In this instance, the microvalves in first channel units $2A_2$, $2A_3$ and $5A_4$ are all in the second state (valve closed state; see FIG. 15A). This enables the reaction liquid in first housing portion 221 of first channel unit $2A_1$ to move to second housing portion 526. In second housing portion 526, a desired reaction is performed. After the reaction in the first step, the reaction liquid introduced into second housing portion 526 from first housing portion 221 of first channel unit $2A_1$ is removed.

(Second Step)

Figure 15A:
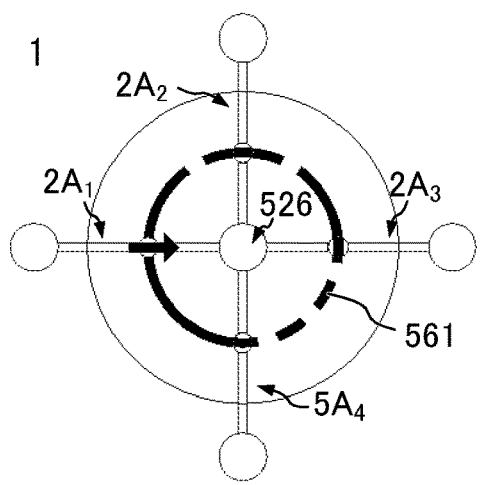
FIGS. 15A to 15F are schematic views of the bottom surface of a fluid handling device for describing respective steps in a fluid handling method according to Embodiment 5.
Figure 15B:
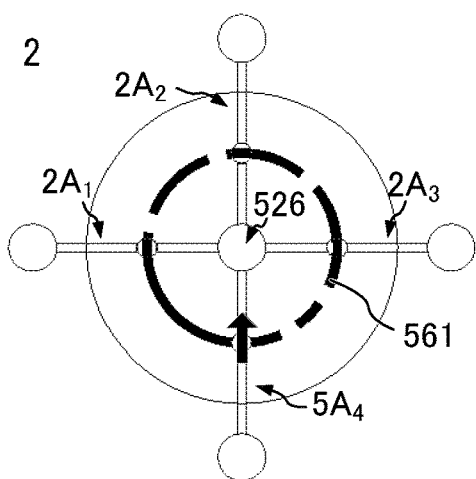

Rotary member 560 is then further rotated for switching the microvalve in first channel unit $5A_4$ to the first state (valve opened state; see FIG. 15B). In this instance, the microvalves in first channel units $2A_1$ to $2A_3$ are all in the second state (valve closed state; see FIG. 15B). This enables the cleaning fluid in first housing portion 221 of first channel unit $5A_4$ to move to second housing portion 526, thereby cleaning the inside of second housing portion 526. After the cleaning in the second step, the cleaning fluid introduced into second housing portion 526 from first housing portion 221 of first channel unit $5A_4$ is removed.

(Third Step)

Figure 15C:
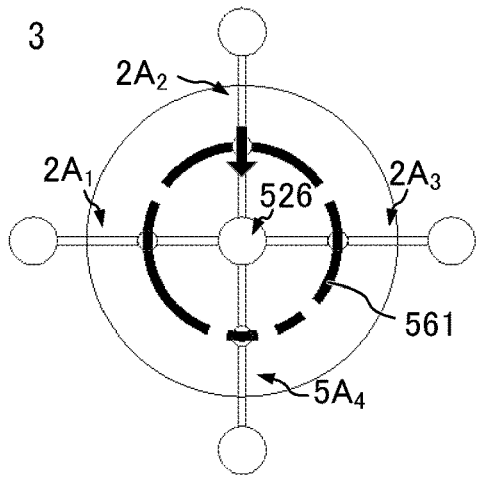

Rotary member 560 is then further rotated for switching the microvalve in first channel unit $2A_2$ to the first state (valve opened state; see FIG. 15C). In this instance, the microvalves in first channel units $2A_1$, $2A_3$ and $5A_4$ are all in the second state (valve closed state; see FIG. 15C). In a similar manner as in the first step, the reaction liquid in first housing portion 221 of first channel unit $2A_2$ moves to second housing portion 526, and a desired reaction is performed. After the reaction in the third step, the reaction liquid introduced into second housing portion 526 from first housing portion 221 of first channel unit $2A_2$ is removed.

(Fourth Step)

Figure 15D:
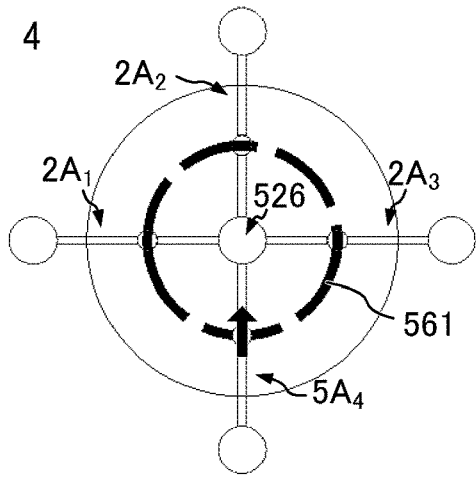

Rotary member 560 is then further rotated for cleaning the inside of second housing portion 526 in a similar manner as in the second step (see FIG. 15D). After the cleaning in the fourth step, the cleaning fluid introduced into second housing portion 526 from first housing portion 221 of first channel unit $5A_4$ is removed.

(Fifth Step)

Figure 15E:
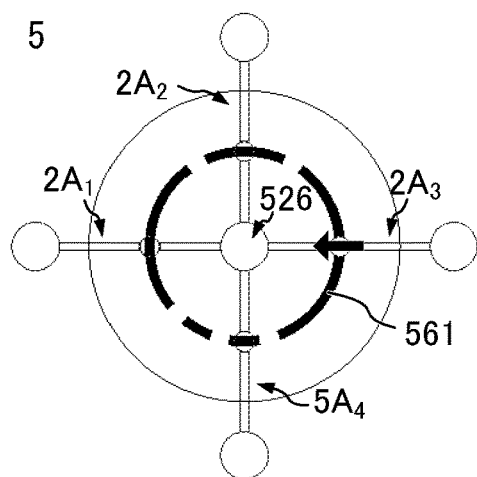

Rotary member 560 is then further rotated for switching the microvalve in first channel unit $2A_3$ to the first state (valve opened state; see FIG. 15E). In this instance, the microvalves in first channel units $2A_1$, $2A_2$ and $5A_4$ are all in the second state (valve closed state; see FIG. 15E). In a similar manner as in the first step, the reaction liquid in first housing portion 221 of first channel unit $2A_3$ moves to second housing portion 526, and a desired reaction is performed. After the reaction in the fifth step, the reaction liquid introduced into second housing portion 526 from first housing portion 221 of first channel unit $2A_3$ is removed.

(Sixth Step)

Figure 15F:
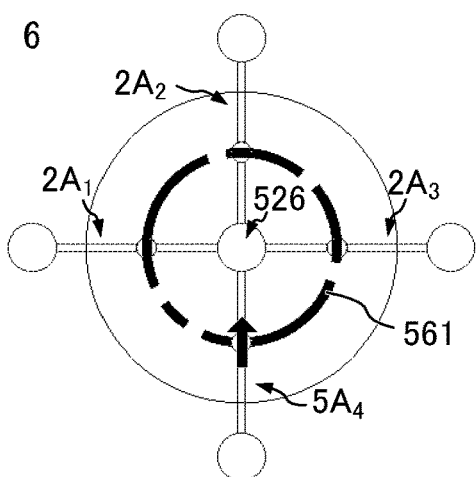

Finally, Rotary member 560 is further rotated for cleaning the inside of second housing portion 526 in a similar manner as in the second step (see FIG. 15F). After the cleaning in the sixth step, the cleaning fluid introduced into second housing portion 526 from first housing portion 221 of first channel unit 5A$_4$ is removed.

In the fluid handling method according to Embodiment 5 as described above, the rotation of rotary member 560 in one direction enables suitable movement of fluids by switching between the first state and the second state. Accordingly, there is no need to rotate rotary member 560 in the opposite direction.

(Effect)

Channel chip 510, fluid handling device 500 and the fluid handling method according to Embodiment 5 have the effects the same as in Embodiment 1.

Modification of Embodiment 5

The fluid handling method according to Embodiment 5 is not limited to the above described method. FIGS. 16A to 16E are schematic views of the bottom surface of fluid handling device 500 for describing respective steps in a fluid handling method according to a modification of Embodiment 5. As illustrated in FIGS. 16A to 16E, the fluid handling method according to the present modification includes first to fifth steps.

(First, Third and Fourth Steps)

The first, third and fourth steps in the modification of Embodiment 5 are the same as the first, second and third steps of the fluid handling method according to Embodiment 5, respectively (compare FIG. 15A to FIG. 16A, FIG. 15B to 16C, and FIG. 15C to 16D). Therefore, the second and fifth steps in the modification of Embodiment 5 are described in the following.

(Second Step)

Figure 16A:
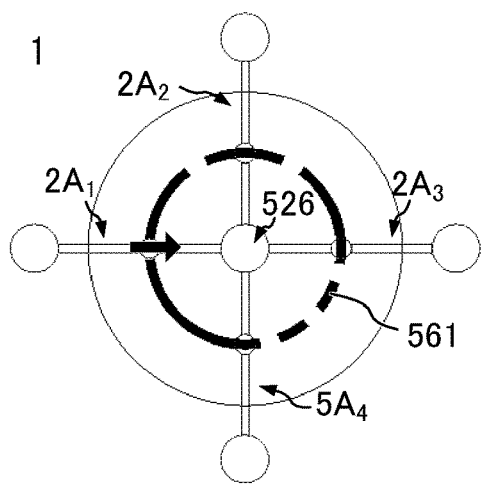
FIGS. 16A to 16E are schematic views of the bottom surface of a fluid handling device for describing respective steps in a fluid handling method according to a modification of Embodiment 5.
Figure 16B:
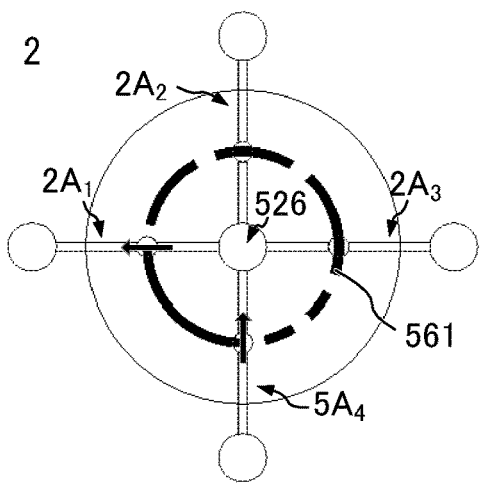
Figure 16C:
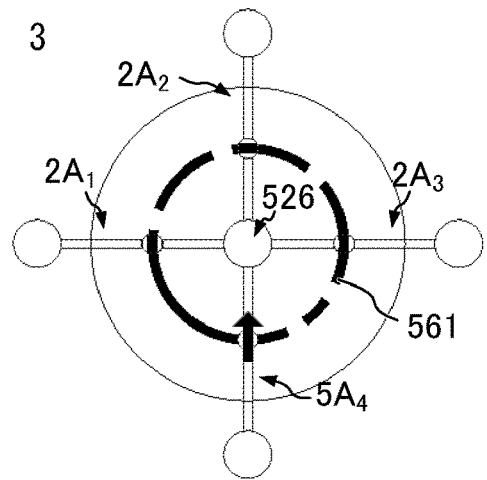
Figure 16D:
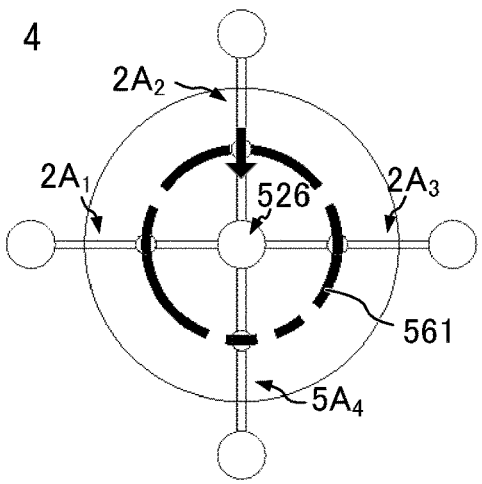

In the second step of the present modification, the microvalve in first channel unit 2A$_1$ as well as the microvalve in first channel unit 5A$_4$ is opened (see FIG. 16B). In this instance, rotary member 560 is disposed in such a way that protrusion 561 partly faces partition walls 223 of first channel units 2A$_1$ and 5A$_4$ with diaphragms 231 and 531 therebetween, respectively. Accordingly, the microvalves in first channel units 2A$_1$ and 5A$_4$ are in a partly opened state in the second step in the present modification. This enables the cleaning fluid in first housing portion 221 of first channel unit 5A$_4$ to move to first housing portion 221 in first channel unit 2A$_1$ through second housing portion 526. Therefore, the second step of the present modification can clean the inside of second channel 224 in first channel unit 2A$_1$ as well as the inside of second housing portion 526. This can prevent the reaction liquid from remaining inside second channel 224 of first channel unit 2A$_1$.

(Fifth Step)

Figure 16E:
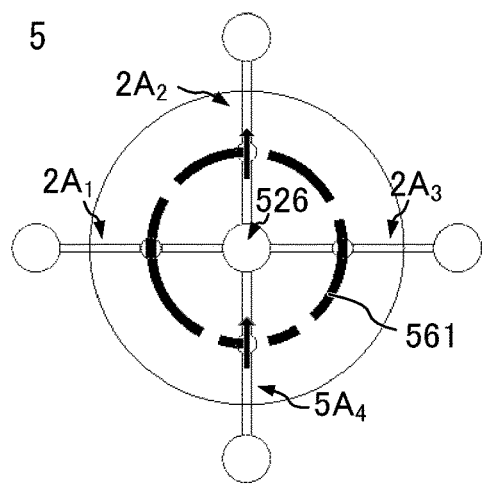

Similarly, in the fifth step of the present modification, the microvalve in first channel units 2A$_2$ as well as the microvalve in first channel unit 5A$_4$ is in a partly opened state (see FIG. 16E). Therefore, the inside of second channel 224 in first channel unit 2A$_2$ as well as the inside of second housing portion 526 can be cleaned in a similar manner as in the second step of the present modification. This can prevent the reaction liquid from remaining inside second channel 224 of first channel unit 2A$_2$.

Embodiment 6

FIGS. 17A to 17C illustrate a configuration of rotary member 660 according to Embodiment 6. FIG. 17A is a plan view of rotary member 660, FIG. 17B is a front view thereof, and FIG. 17C is a cross-sectional view taken along line C-C in FIG. 17A.

(Configuration of Fluid Handling Device)

A fluid handling device according to Embodiment 6 includes channel chip 510 and rotary member 660. The fluid handling device according to Embodiment 6 is the same as fluid handling device 500 according to Embodiment 5 except for a configuration of rotary member 660. Therefore, the same reference numerals are given to the components the same as those of fluid handling device 500 according to Embodiment 5, and the descriptions thereof will be omitted.

Rotary member 660 is the same as rotary member 560 according to Embodiment 5 except that notches 662a to 662c formed in protrusion 661 are different in size from notches 562a to 562c formed in protrusion 561.

Protrusion 661 includes six notches 662a to 662c and 562d to 562f. In the present embodiment, notches 662A to 662C are different from notches 562d to 562f in length in the circumferential direction of rotary member 660. The length of each of notches 662a to 662c is about twice the size of diaphragm 231 in plan view. The length of each of notches 562d to 562f is about the same as the size of diaphragm 231 in plan view.

(Fluid Handling Method)

FIGS. 18A to 18F are schematic views of the bottom surface of a fluid handling device for describing respective steps in a fluid handling method according to Embodiment 6. As illustrated in FIGS. 18A to 18F, the fluid handling method according to Embodiment 6 includes first to sixth steps.

(First, Third and Fifth Steps)

The first, third and fifth steps in Embodiment 6 are the same as the first, third and fifth steps in Embodiment 5, respectively (compare FIG. 15A to FIG. 18A, FIG. 15C to 18C, and FIG. 15E to 18E). The second, fourth and sixth steps are described in the following.

(Second Step)

The second step in Embodiment 6 is substantially the same as the second step in the modification of Embodiment 5 (compare FIG. 16B to FIG. 18B). In the second step of Embodiment 6, the microvalve in first channel unit 2A$_1$ as well as the microvalve in first channel unit 5A$_4$ is in the first state (valve opened state; see FIG. 18B). In this instance, rotary member 660 is disposed in such a way that protrusion 661 does not face partition wall 223 of first channel unit 2A$_1$ or 5A$_4$ with diaphragm 231 or 531 therebetween, respectively. This can clean the inside of second channel 224 in first channel unit 2A$_1$ as well as the inside of second housing portion 526, thereby preventing the reaction liquid from remaining inside second channel 224 of first channel unit 2A$_1$. After the cleaning in the second step, the cleaning fluid introduced into second housing portion 526 from first housing portion 221 of first channel unit 5A$_4$ is removed.

As described above, the microvalves in first channel units 2A$_1$ and 5A$_4$ are in a partly opened state in the second step in the modification of Embodiment 5. In the second step of Embodiment 6, meanwhile, protrusion 661 does not face partition wall 223 in first channel unit 2A$_1$ or 5A$_4$ at all. Therefore, the microvalves in first channel units 2A$_1$ and 5A$_4$ are fully opened compared to the modification, and thus more fluid can move through in the second step of Embodiment 6. The same can applies to the fourth and sixth steps in Embodiment 6 described below.

(Fourth Step)

The fourth step in Embodiment 6 is substantially the same as as the fifth step in the modification of Embodiment 5

Figure 18A:
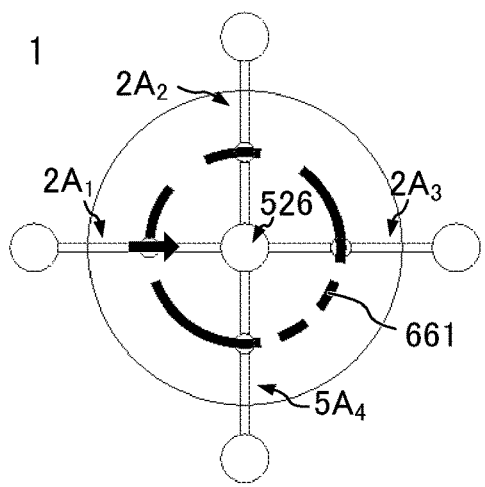
FIGS. 18A to 18F are schematic views of the bottom surface of a fluid handling device for describing respective steps in a fluid handling method according to Embodiment 6.
Figure 18B:
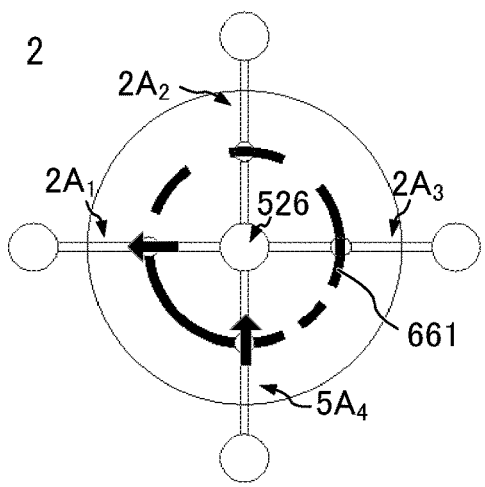
Figure 18C:
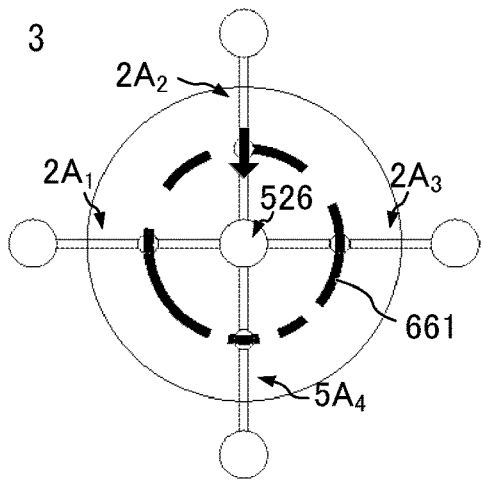
Figure 18D:
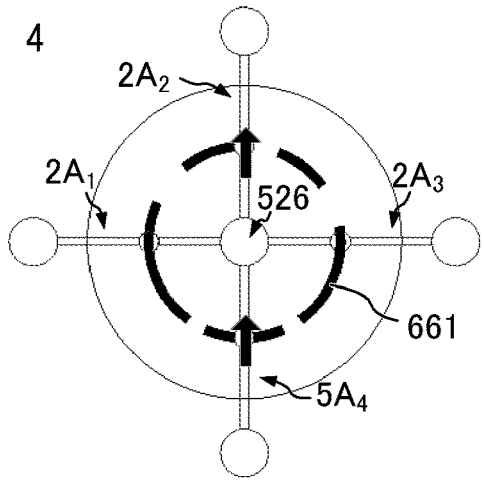
Figure 18E:
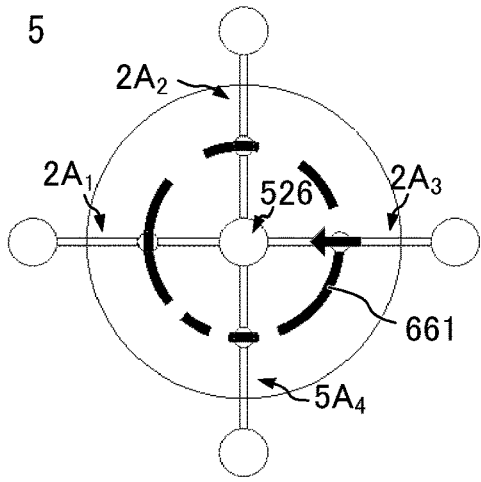

(compare FIG. 16E and FIG. 18D). In the fourth step of Embodiment 6, the microvalve in first channel unit $2A_2$ as well as the microvalve in first channel unit $5A_4$ is in the first state (valve opened state; see FIG. 18D). This can clean the inside of second channel 224 in first channel unit $2A_2$ as well as the inside of second housing portion 526, thereby preventing the reaction liquid from remaining inside second channel 224 of first channel unit $2A_2$, in a similar manner as in the second step of Embodiment 6. After the cleaning in the fourth step, the cleaning fluid introduced into second housing portion 526 from first housing portion 221 of first channel unit $5A_4$ is removed.

(Sixth Step)

Figure 18F:
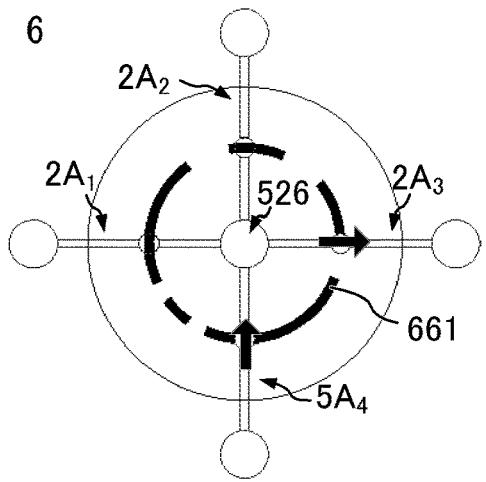

In the sixth step of Embodiment 6, the microvalve in first channel unit $2A_3$ as well as the microvalve in first channel unit $5A_4$ is in the first state (valve opened state; see FIG. 18F). This can clean the inside of second channel 224 in first channel unit $2A_3$ as well as the inside of second housing portion 526, thereby preventing the reaction liquid from remaining inside second channel 224 of first channel unit $2A_3$, in a similar manner as in the second step of Embodiment 6. After the cleaning in the sixth step, the cleaning fluid introduced into second housing portion 526 from first housing portion 221 of first channel unit $5A_4$ is removed.

(Effect)

Channel chip 610, the fluid handling device and the fluid handling method according to Embodiment 6 have the effects the same as in the modification of Embodiment 5.

Embodiment 7

(Configuration of Fluid Handling Device)

Figure 19A:
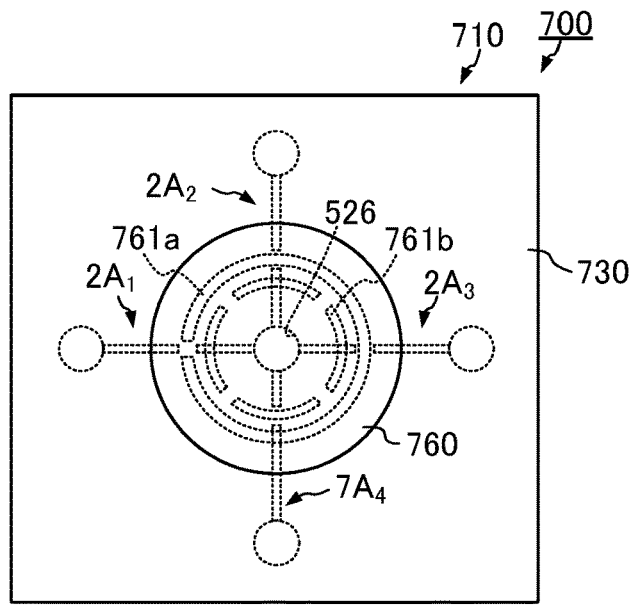
FIGS. 19A to 19C illustrate a configuration of a fluid handling device or channel chip according to Embodiment 7.
Figure 19B:
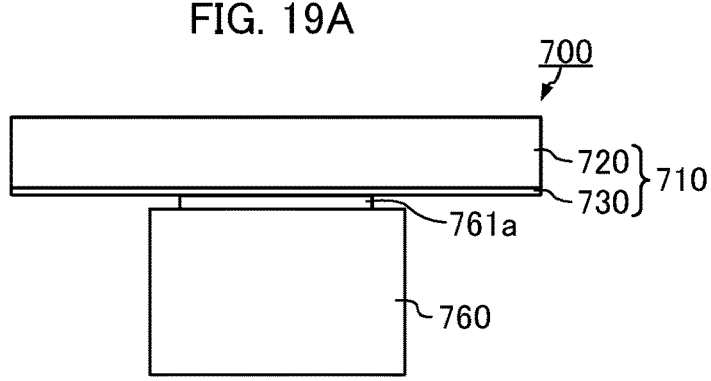
Figure 19C:
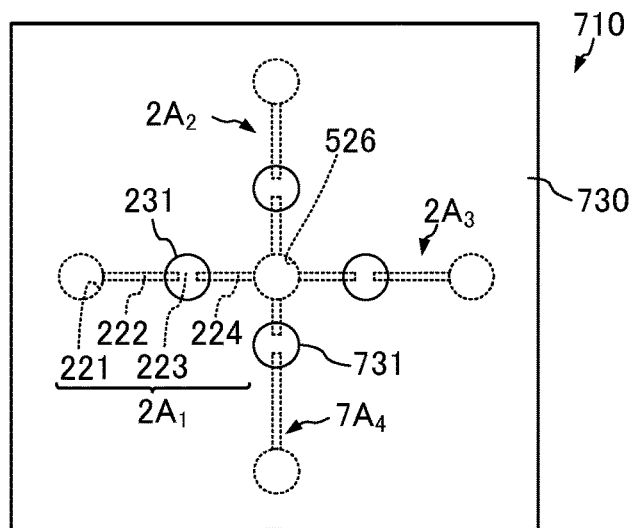
Figure 20A:
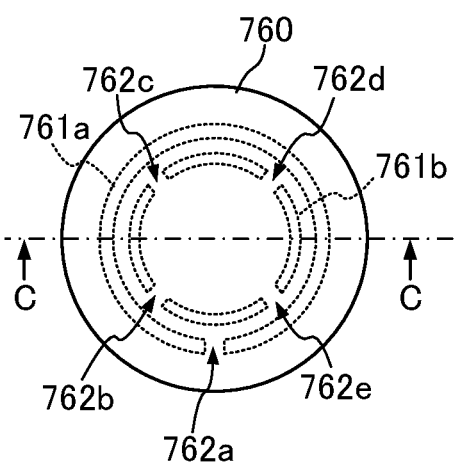
FIGS. 20A to 20C illustrate a configuration of a rotary member according to Embodiment 7.
Figure 20B:
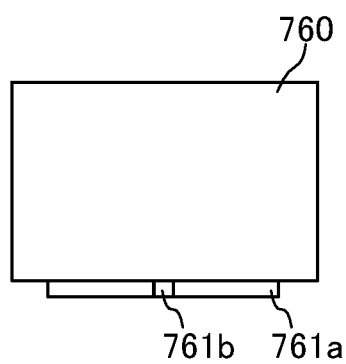
Figure 20C:
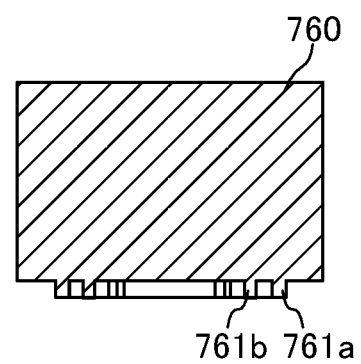
Figure 21A:
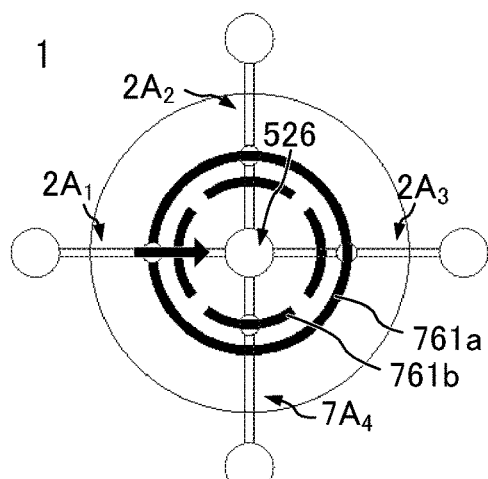
FIGS. 21A to 21F are schematic views of the bottom surface of a fluid handling device for describing respective steps in a fluid handling method according to Embodiment 7.
Figure 21B:
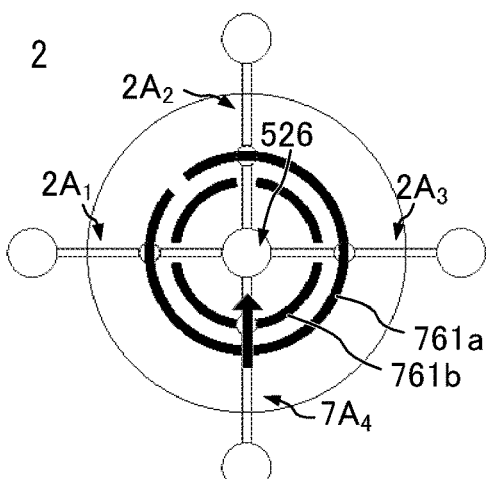
Figure 21C:
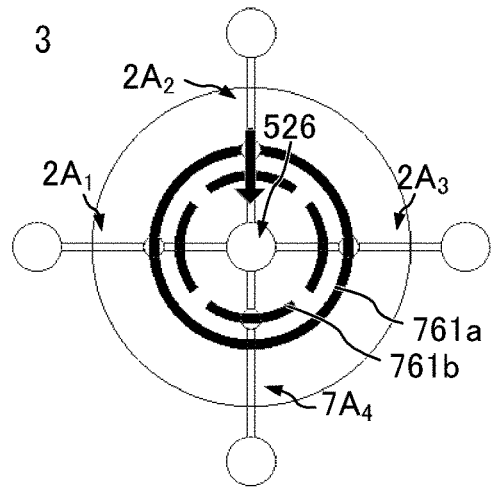
Figure 21D:
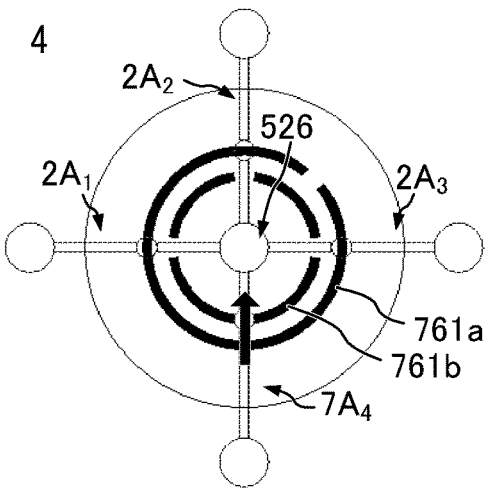
Figure 21E:
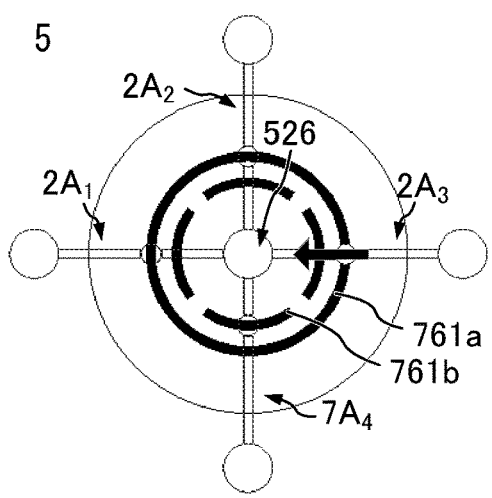
Figure 21F:
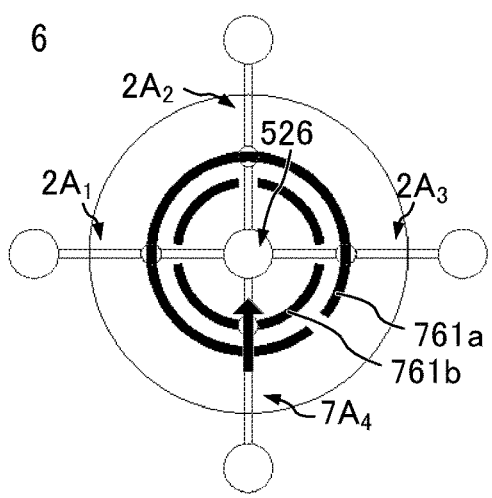

FIGS. 19A to 19C illustrate a configuration of fluid handling device 700 or channel chip 710 according to Embodiment 7. FIG. 19A is a bottom view of fluid handling device 700, FIG. 12B is a front view thereof, and FIG. 19C is a bottom view of channel chip 710. FIGS. 20A to 20C illustrate a configuration of rotary member 760 according to Embodiment 7. FIG. 20A is a plan view of rotary member 760, FIG. 20B is a front view thereof, and FIG. 20C is a cross-sectional view taken along line C-C in FIG. 20A.

Fluid handling device 700 according to Embodiment 7 includes channel chip 710 and rotary member 760. Some of the components of the fluid handling device according to Embodiment 7 are the same as those of fluid handling device 500 according to Embodiment 5. Therefore, the same reference numerals are given to the components the same as those of fluid handling device 500 according to Embodiment 5, and the descriptions thereof will be omitted.

Channel chip 710 includes substrate 720 and film 730. Substrate 720 has a groove and/or through hole formed therein as appropriate within a range that can obtain the effect of the present embodiment. The thickness and example materials of substrate 720 are the same as those of substrate 120 according to Embodiment 1.

Film 730 includes three diaphragms 231 and one diaphragm 731. Film 730 is the same as film 530 in Embodiment 5 except for the position of diaphragm 731. Diaphragm 731 is disposed above partition wall 223 of first channel unit $7A_4$. Diaphragm 731 is, except for the position thereof on film 730, the same as diaphragm 531 in Embodiment 5.

Channel chip 710 includes channels for running a fluid therethrough, such as a reagent, liquid sample, gas or powder. More specifically, channel chip 710 includes four first channel units $2A_1$ to $2A_3$ and $7A_4$, and second housing portion 526. Channel chip 710 is the same as channel chip 510 according to Embodiment 5 except that channel chip 710 includes first channel unit $7A_4$ in place of first channel unit $5A_4$. First channel unit $7A_4$ is the same as first channel unit $5A_4$ except for the position of partition wall 223. Partition wall 223 in first channel unit $7A_4$ is disposed at a position close to second housing portion 526 compared to partition wall 223 in first channel unit $5A_4$ (compare FIG. 13A to FIG. 19C).

First protrusion 761a and second protrusion 761b are formed on the underside of rotary member 760. First protrusion 761a and second protrusion 761b are projected lines extending along the rotation direction of rotary member 760. First protrusion 761a and second protrusion 761b are concentrically disposed when rotary member 760 is viewed from the bottom. In the present embodiment, first protrusion 761a is positioned so as to surround second protrusion 761b when rotary member 760 is viewed from the bottom.

First protrusion 761a includes one notch 762a. The length of notch 762a in the circumferential direction of rotary member 760 is, for example, the same as or larger than the size of each of diaphragms 231 and 731 in plan view. In the present embodiment, the length of notch 762a is about the same as the size of each of diaphragms 231 and 731.

Second protrusion 761b includes four notches 762b to 762e. The length of each of notches 762b to 762e in the circumferential direction of rotary member 760 is, for example, the same as or larger than the size of each of diaphragms 231 and 731 in plan view. In the present embodiment, notches 762b to 762e have identical lengths that are about the same as the size of diaphragms 231 and 731. In the present embodiment, notches 762b to 762e are disposed respectively at positions corresponding to four corners of a virtual quadrangle that circumscribes second protrusion 761b.

FIGS. 21A to 21F are schematic views of the bottom surface of a fluid handling device for describing respective steps in a fluid handling method according to Embodiment 7. As illustrated in FIGS. 21A to 21F, the fluid handling method according to Embodiment 7 includes first to sixth steps. The first to sixth steps in Embodiment 7 correspond to the first to sixth steps in Embodiment 5 in view of the moving direction of a fluid (compare FIGS. 15A to 15F to FIGS. 21A to 21F), respectively.

The fluid handling method according to Embodiment 7 is the same as the fluid handling method according to Embodiment 5 except that first protrusion 761a contributes to the switching of the open/close state (between the first state and second state) of the microvalve in each of first channel units $2A_1$ to $2A_3$, while second protrusion 761b contributes to the switching of the open/close state (between the first state and second state) of the microvalve in first channel unit $7A_4$.

(Effect)

Channel chip 710, fluid handling device 700 and the fluid handling method according to Embodiment 7 have the effects the same as in Embodiment 5.

Embodiment 8

Figure 22:
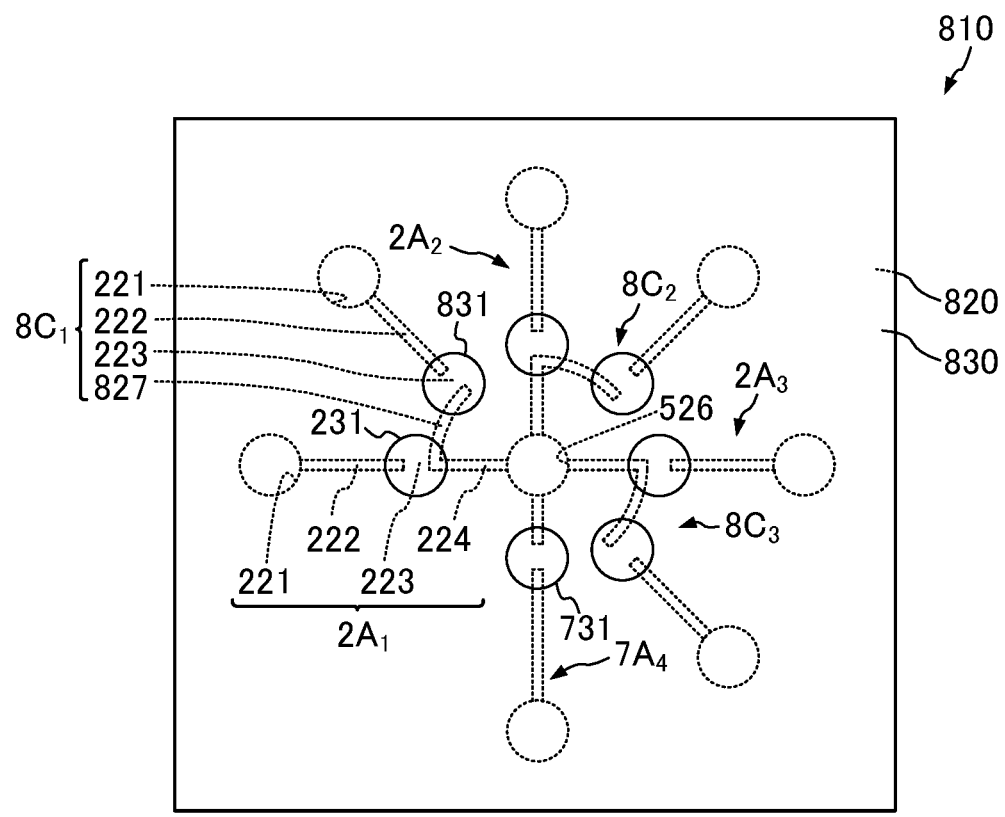
FIG. 22 illustrates a configuration of a channel chip according to Embodiment 8.

FIG. 22 illustrates a configuration of channel chip 810 according to Embodiment 8.

A fluid handling device according to Embodiment 8 includes channel chip 810 and rotary member 760. The fluid handling device according to Embodiment 8 is the same as fluid handling device 700 according to Embodiment 7 except for a configuration of channel chip 810. Therefore, the same reference numerals are given to the components the same as those of fluid handling device 700 according to Embodiment 7, and the descriptions thereof will be omitted.

Channel chip 810 includes substrate 820 and film 830. Substrate 820 has a groove and/or through hole formed therein as appropriate within a range that can obtain the effect of the present embodiment. The thickness and example materials of substrate 820 are the same as those of substrate 120 according to Embodiment 1.

Film 830 includes three diaphragms 231, one diaphragm 731 and three diaphragms 831. Film 830 is the same as film 730 in Embodiment 7 except for the number of diaphragms 231, 731 and 831. Diaphragms 831 are disposed above partition walls 223 in below described third channel units $8C_1$ to $8C_3$, respectively. Diaphragms 831 are, except for the positions thereof on film 830, the same as diaphragm 531 in Embodiment 5.

Channel chip 810 includes channels for running a fluid therethrough, such as a reagent, liquid sample, gas or powder. More specifically, channel chip 810 includes four first channel units $2A_1$ to $2A_3$ and $7A_4$, three third channel units $8C_1$ to $8C_3$ and second housing portion 526. Channel chip 810 is the same as channel chip 710 according to Embodiment 7 except that channel chip 810 further includes three third channel units $8C_1$ to $8C_3$. Three third channel units $8C_1$ to $8C_3$ have identical configurations except for the positions of the channel units in channel chip 810. Therefore, only third channel unit $8C_1$ is described in the following.

Third channel unit $8C_1$ includes first housing portion 221, first channel 222, partition wall 223 and fourth channel 827.

Fourth channel 827 allows a fluid to move therein. Partition wall 223 of third channel unit $8C_1$ is disposed at one end of fourth channel 827. At the other end of fourth channel 827, the upstream end of second channel 224 and partition wall 223 both in first channel unit $2A_1$ are disposed. In the present embodiment, fourth channel 827 may be composed of a groove formed in substrate 820 and film 830 blocking the opening of the groove. The cross-sectional area and cross-sectional shape of fourth channel 827 are the same as those of first channel 122a in Embodiment 1, respectively.

Figure 23A:
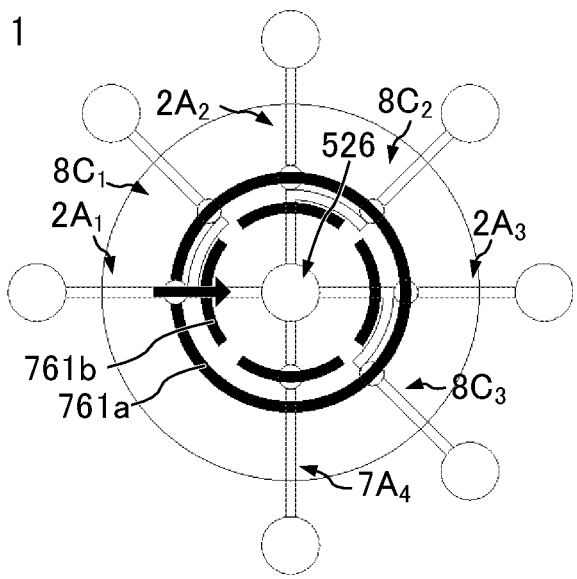
FIGS. 23A and 23B are schematic views of the bottom surface of a fluid handling device for describing respective steps in a fluid handling method according to Embodiment 8.
Figure 23B:
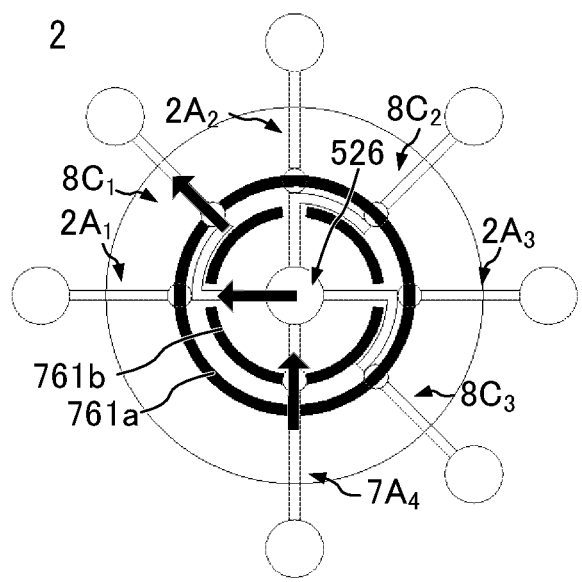

FIGS. 23A and 23B are schematic views of the bottom surface of a fluid handling device for describing respective steps in a fluid handling method according to Embodiment 8. As illustrated in FIGS. 23A and 23B, the fluid handling method according to Embodiment 8 includes first and second steps. The first step in Embodiment 8 corresponds to the first step in Embodiment 7 in view of the moving direction of a fluid (compare FIG. 21A to FIG. 23A). Therefore, the second step in Embodiment 8 is described in the following.

In the second step of Embodiment 8, the microvalve in third channel unit $8C_1$ as well as the microvalve in first channel unit $7A_4$ is in the first state (valve opened state; see FIG. 23B). A cleaning fluid in first housing portion 221 of first channel unit $7A_4$ thus moves through second housing portion 526, then second channel 224 of first channel unit $2A_1$ to reach first housing portion 221 in third channel unit $8C_1$. Therefore, the second step of Embodiment 8 can clean the inside of second channel 224 of first channel unit $2A_1$ as well as the inside of second housing portion 526. This can prevent the reaction liquid from remaining inside second channel 224 of first channel unit $2A_1$.

In addition, the microvalves in first channel units $2A_1$ to $2A_3$ are all in the second state (valve closed state) in the second step of Embodiment 8. The cleaning fluid in first housing portion 221 of first channel unit $7A_4$ thus does not flow into first channels 222 of first channel units $2A_1$ to $2A_3$.

(Effect)

Channel chip 810, the fluid handling device and the fluid handling method according to Embodiment 8 have the effects the same as in Embodiment 7. In addition, Embodiment 8 can prevent a cleaning fluid from flowing into first channel 222, and also a reaction liquid from remaining inside second channel 224.

Embodiment 9

Figure 24A:
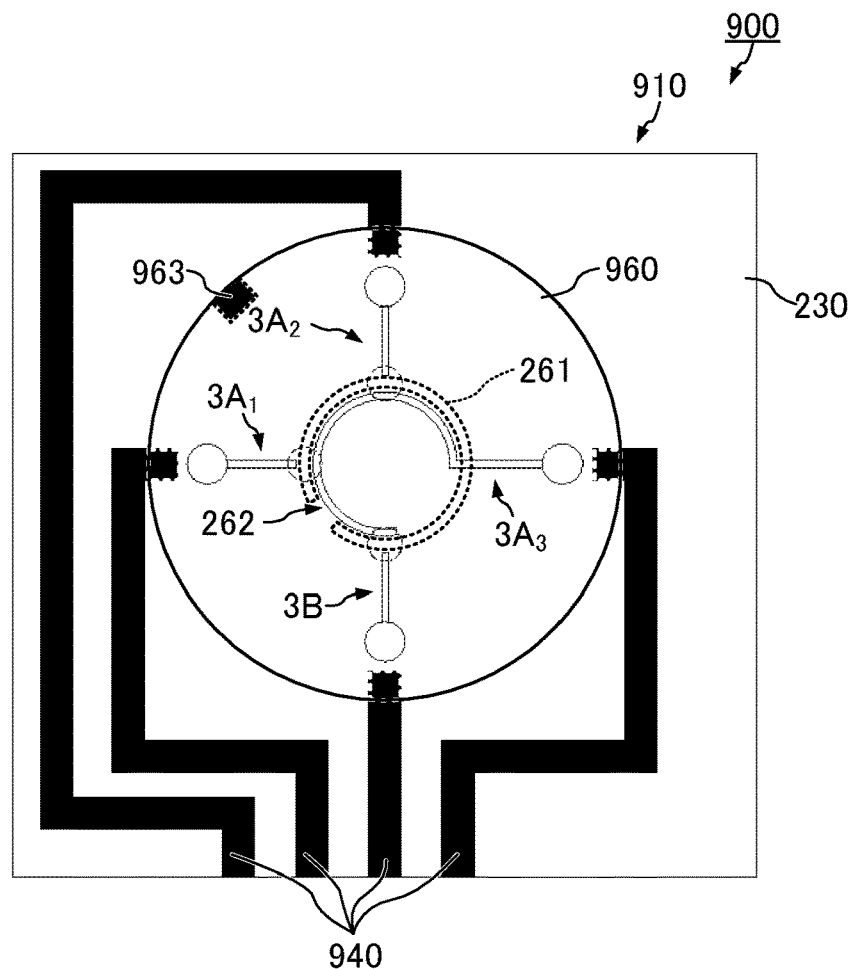
FIGS. 24A and 24B illustrate a configuration of a fluid handling device according to Embodiment 9.
Figure 24B:
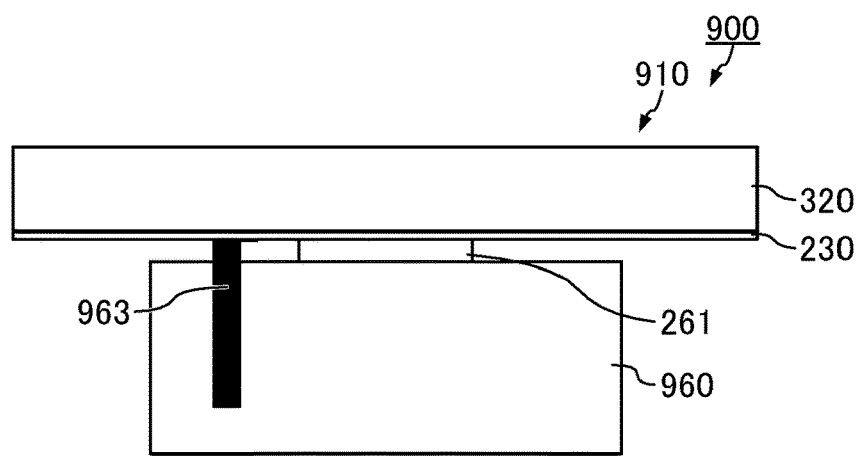

FIGS. 24A and 24B illustrate a configuration of fluid handling device 900 according to Embodiment 9. FIG. 24A is a bottom view illustrating the configuration of fluid handling device 900, and FIG. 24B is a front view thereof. Fluid handling device 900 according to Embodiment 9 includes channel chip 910 and rotary member 960. Some of the components of fluid handling device 900 according to Embodiment 9 are the same as those of the fluid handling device according to Embodiment 3. Therefore, the same reference numerals are given to the components the same as those of the fluid handling device according to Embodiment 3, and the descriptions thereof will be omitted.

Channel chip 910 includes substrate 320, film 230 and first electrode 940.

Channel chip 910 is the same as channel chip 310 according to Embodiment 3 except that channel chip 910 further includes first electrode 940. In the present embodiment, substrate 320 is composed of an insulation material.

First electrode 940 may be at any position as long as first electrode 940 can contact second electrode 963. First electrode 940 may be disposed on, for example, film 230 or substrate 320. When first electrode 940 is disposed on substrate 320, a through hole is formed in the film for exposing the first electrode 940 on the surface of channel chip 810. In the present embodiment, first electrode 940 is disposed on film 230.

The position and shape of first electrode 940 are not limited as long as first electrode 940 can contact second electrode 963 on rotary member 960. In fluid handling device 900, first electrode 940 is disposed at least at a position facing the bottom surface of rotary member 960. For the connection with an external circuit, first electrode 940 may extend to the outer edge of film 230.

The number of first electrodes 940 is not limited, and may be appropriately set in accordance with, for example, the number of the channel units in channel chip 910. The present embodiment has four first electrodes 940 which are disposed in the vicinities of first channel units $3A_1$ to $3A_3$ and second channel unit 3B, respectively, when channel chip 910 is viewed from the bottom.

In the present embodiment, first electrodes 940 are disposed on film 230 at least at positions corresponding to partition walls 223.

Any material that has desired conductivity may be selected for first electrode 940. For example, examples of the materials of first electrode 940 include gold, silver, copper, aluminum, alloys thereof, and carbon paste. Examples of methods for forming first electrode 940 include sputtering, vapor deposition, plating and printing. First electrode 940 may have any thickness which is, for example, preferably 100 nm to 20 μm.

Rotary member 960 includes protrusion 261 and second electrode 963. Rotary member 960 is the same as rotary member 260 in Embodiment 2 except that rotary member 960 has a size different from rotary member 260, and further includes second electrode 963. In the present embodiment, the body of rotary member 960 is composed of an insulation material.

Second electrode 963 may be at any position as long as second electrode 963 can contact first electrode 940. Second electrode 963 is disposed on the outer surface of the body of rotary member 960. In the present embodiment, second electrode 963 is disposed at least on the bottom surface of rotary member 960. Second electrode 963 may be disposed in such a way that a part thereof to be in contact with first electrode 940 is approximately at the same height as the upper surface of protrusion 261. For the connection with an external circuit, second electrode 963 may extend to the side surface or top surface of rotary member 960.

Second electrode 963 may have any shape as long as second electrode 963 can contact first electrode 940 disposed on film 230. The part, which is to be in contact with first electrode 940, in second electrode 963 may be formed to protrude toward first electrode 940.

In the present embodiment, second electrode 963 is disposed on the bottom surface of the body of rotary member 960 at least at a position corresponding to notch 262 formed in protrusion 261.

The thickness and example materials of second electrode 963, and the methods for forming second electrode 963 are the same as in the case of first electrode 940.

A fluid handling method using fluid handling device 900 according to Embodiment 9 is the same as the fluid handling method according to Embodiment 3. In addition, in Embodiment 9, first electrode 940 disposed on film 230 can contact second electrode 963 disposed on the body of rotary member 960 when rotary member 960 is rotated. The external circuit can detect the contact between first electrode 940 and second electrode 963. The rotational position of rotary member 960 (at least one of the positions of protrusion 261 and notch 262) may be detected on the basis of the detection result.

As described above, first electrodes 940 are disposed at positions corresponding to partition walls 223 of channel units, respectively, in Embodiment 9. Second electrode 963 is disposed on the bottom surface of the body of rotary member 960 at a position facing notch 262 of protrusion 261. The occasion when notch 262 of rotary member 960 is positioned above partition wall 223 (switched to the first state) thus can be detected on the basis of the above detection result. Therefore, the rotational position of rotary member 960 can be accurately detected for switching between the first state and second state in each channel unit.

(Effect)

Channel chip 910, fluid handling device 900 and the fluid handling method according to Embodiment 9 have the effects the same as in Embodiment 3. In addition, the rotational position of rotary member 960 can be accurately detected in Embodiment 9.

Embodiment 10

(Configuration of Fluid Handling Device)

Figure 25A:
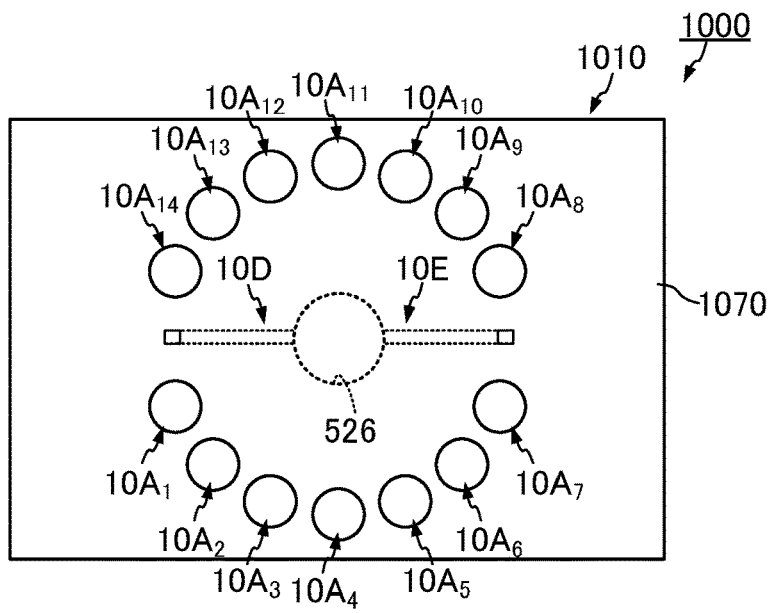
FIGS. 25A to 25C illustrate a configuration of a fluid handling device according to Embodiment 10.
Figure 25B:
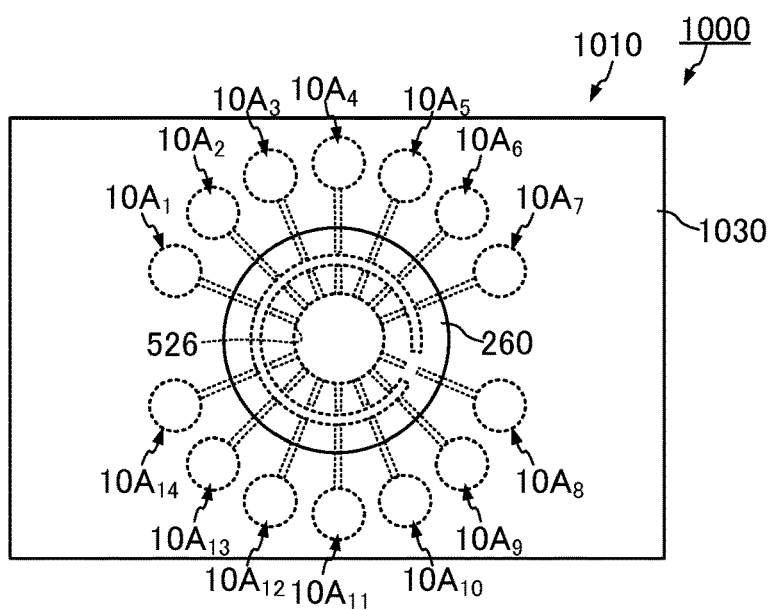
Figure 25C:
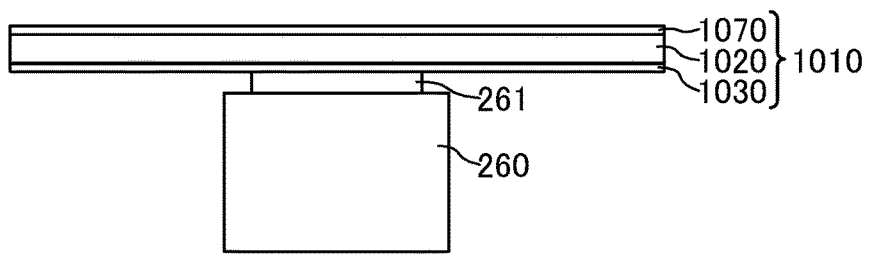
Figure 26A:
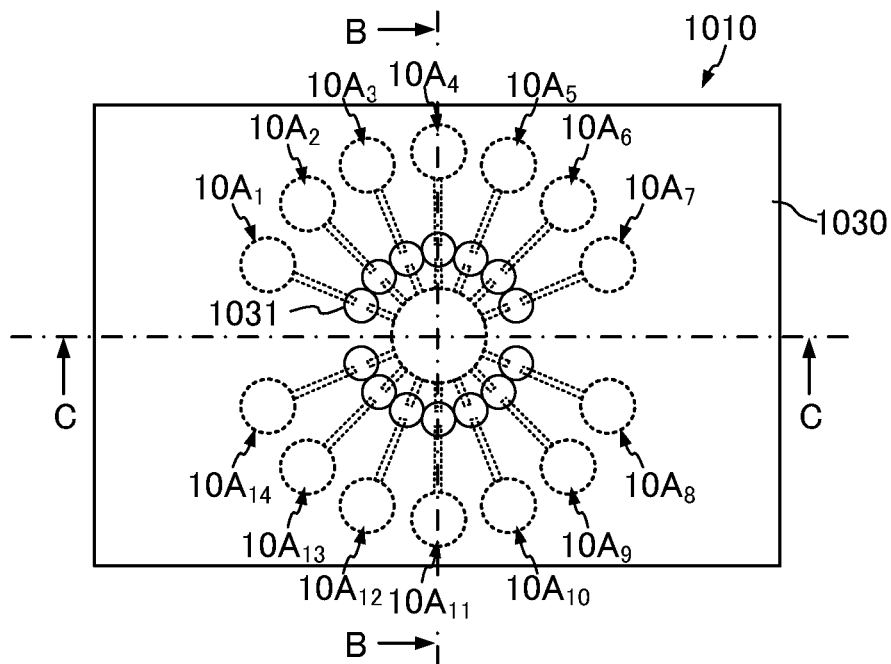
FIGS. 26A to 26C illustrate a configuration of a channel chip according to Embodiment 10.
Figure 26B:
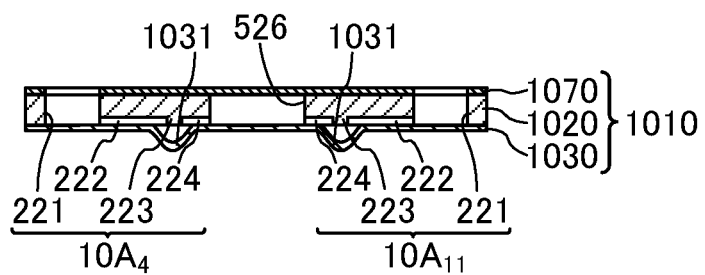
Figure 26C:
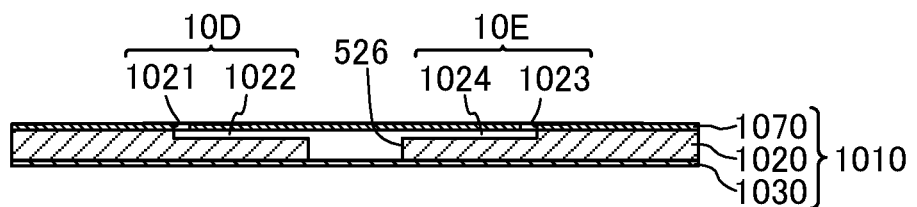

FIGS. 25A to 25C illustrate a configuration of fluid handling device 1000 according to Embodiment 10. FIG. 25A is a plan view illustrating the configuration of fluid handling device 1000, FIG. 25B is a bottom view thereof, and FIG. 25C is a front view thereof. FIGS. 26A to 26C illustrate a configuration of channel chip 1010 according to Embodiment 10. FIG. 26A is a bottom view of channel chip 1010, FIG. 26B is a cross-sectional view taken along line B-B in FIG. 26A, and FIG. 26C is a cross-sectional view taken along line C-C in FIG. 26A.

Fluid handling device 1000 according to Embodiment 10 includes channel chip 1010 and rotary member 260. Fluid handling device 1000 according to Embodiment 10 includes channel chip 1010 whose configuration is different from channel chip 510 according to Embodiment 5, and rotary member 260 whose configuration is the same as rotary member 260 according to Embodiment 2. Therefore, the same reference numerals are given to the components the same as those of fluid handling devices 200 and 500 according to respective Embodiments 2 and 5, and the descriptions thereof will be omitted.

Channel chip 1010 includes substrate 1020, film 1030 and cover 1070.

Substrate 1020 has a groove and/or through hole formed therein as appropriate within a range that can obtain the effect of the present embodiment. The thickness and example materials of substrate 1020 are the same as those of substrate 120 according to Embodiment 1.

Film 1030 includes fourteen diaphragms 1031. Film 530 is the same as film 530 in Embodiment 5 except for the number of diaphragms 1031. Diaphragm 1031 is disposed above partition wall 223 in below described first channel unit $10A_4$. Diaphragms 1031 are, except for the positions thereof on film 1030, the same as diaphragms 131$a$ to 131$d$ in Embodiment 1.

Cover 1070 is disposed on the top surface of substrate 1020. As will be described in detail below, cover 1070 partly covers grooves formed in substrate 1020, thereby forming pressure-reducing unit 10D and pressure-increasing unit 10E.

The position and size of cover 1070 are not limited, and are set as appropriate within a range that can obtain the effect of the present embodiment. Cover 1070 covers at least the groove used for pressure-reducing unit 10D and the groove used for pressure-increasing unit 10E. Cover 1070 may be flexible, or rigid. In the present embodiment, cover 1070 is a flexible film. Examples of the materials of cover 1070 are the same as those of first film 130 in Embodiment 1.

Channel chip 1010 includes channels for running a fluid therethrough, such as a reagent, liquid sample, gas or powder. More specifically, channel chip 1010 includes fourteen first channel units $10A_1$ to $10A_{14}$, second housing portion 526, pressure-reducing unit 10D and pressure-increasing unit 10E.

When channel chip 1010 is viewed from the bottom, fourteen first channel units $10A_1$ to $10A_{14}$ are disposed radially from second housing portion 526 as the center. Fourteen first channel units $10A_1$ to $10A_{14}$ have identical configurations except for the positions of the channel units in channel chip 1010. Therefore, only first channel unit $10A_1$ is described. First channel unit $10A_1$ includes first housing portion 221, first channel 222, partition wall 223 and second channel 224.

Pressure-reducing unit 10D includes pressure-reducing port 1021 and pressure-reducing channel 1022. Pressure-reducing unit 10D is disposed in channel chip 1010 and on the surface opposite to the surface (substrate 1030) having first channel units $10A_1$ to $10A_{14}$ disposed thereon.

Pressure-reducing port 1021 is an opening that can be connected to a pump for reducing the atmospheric pressure inside second housing portion 526. Pressure-reducing port 1021 may have any shape or size, and may be appropriately designed as necessary.

Pressure-reducing channel 1022 is disposed between second housing portion 526 and pressure-reducing port 1021. Pressure-reducing channel 1022 is connected to second housing portion 526 at one end, and to pressure-reducing port 1021 at the other end. Pressure-reducing channel 1022 allows second housing portion 526 to communicate with the outside. The cross-sectional area and the cross-sectional shape of pressure-reducing channel 1022 are not limited, as long as the pressure inside second housing portion 526 can be suitably reduced by using a pump or the like.

In the present embodiment, pressure-reducing channel 1022 is composed of a groove formed in substrate 1020 and cover 1070 blocking the opening of the groove. In the present embodiment, cover 1070 has a through hole formed therein at a position corresponding to one end portion of the groove, and thus cover 1070 does not cover the end portion of the groove. This forms pressure-reducing port 1021.

Pressure-increasing unit 10E includes pressure-increasing port 1023 and pressure-increasing channel 1024. Pressure-increasing unit 10E is disposed in channel chip 1010 and on the surface opposite to the surface (substrate 1030) having first channel units $10A_1$ to $10A_{14}$ disposed thereon.

Pressure-increasing port 1023 is an opening that can be connected to a pump for increasing the atmospheric pressure inside second housing portion 526.

Pressure-increasing port 1023 may have any shape or size, and may be appropriately designed as necessary.

Pressure-increasing channel 1024 is disposed between second housing portion 526 and pressure-increasing port 1023. Pressure-increasing channel 1024 is connected to second housing portion 526 at one end, and to pressure-increasing port 1023 at the other end. Pressure-increasing channel 1024 allows second housing portion 526 to communicate with the outside. The cross-sectional area and the cross-sectional shape of pressure-increasing channel 1024 are not limited, as long as the pressure inside second housing portion 526 can be suitably increased by using a pump or the like.

In the present embodiment, pressure-increasing channel 1024 may be composed of a groove formed in substrate 1020 and cover 1070 blocking the opening of the groove. In the present embodiment, cover 1070 has a through hole formed therein at a position corresponding to one end portion of the groove, and thus cover 1070 does not cover the end portion of the groove. This forms pressure-increasing port 1023.

(Fluid Handling Method)

Hereinafter, described is an example of a method for handling a fluid by using fluid handling device 1000 according to Embodiment 10 (fluid handling method according to Embodiment 10). In the following, a method is described in which liquids in respective first housing portions 221 of first channel units $10A_1$ and $10A_2$ are each moved to second housing portion 526, and mixed, and then the obtained mixture is moved to first housing portion 221 of first channel unit $10A_{14}$.

Desired liquids are previously stored in first housing portions 221 of first channel units $10A_1$ and $10A_2$, respectively. Rotary member 260 is then rotated for switching the microvalve in first channel unit $10A_1$ to the first state (valve opened state). In this instance, the microvalves in respective first channel units $10A_2$ to $10A_{14}$ are all in the second state (valve closed state). During this state, the inside of second housing portion 526 is set to a negative pressure by using a suction pump via pressure-reducing port 1021 and pressure-reducing channel 1022. This enables the liquid stored in first housing portion 221 of first channel unit $10A_1$ to move to second housing portion 526.

The amount of the liquid to be moved to second housing portion 526 may be adjusted as appropriate in accordance with the atmospheric pressure to be reduced inside second housing portion 526. For preventing the suction pump from sucking the liquid, the amount of the liquid to be introduced into second housing portion 526 can be adjusted in such a way that the liquid does not reach the opening of pressure-reducing channel 1022 that is opened to second housing portion 526.

Rotary member 260 is then further rotated for switching the microvalve in first channel unit $10A_2$ to the first state (valve opened state). In this instance, the microvalves in respective first channel units $10A_1$ and $10A_3$ to $10A_{14}$ are all in the second state (valve closed state). During this state, the inside of second housing portion 526 is set to a negative pressure in the same manner as in the above procedure, thereby moving the liquid stored in first housing portion 221 of first channel unit $10A_2$ to second housing portion 526. This can mix the liquid from first channel unit $10A_1$ with and the liquid from first channel unit $10A_2$ in second housing portion 526.

Rotary member 260 is then further rotated for switching the microvalve in first channel unit $10A_{14}$ to the first state (valve opened state). In this instance, the microvalves in respective first channel units $10A_1$ to $10A_{13}$ are all in the second state (valve closed state). During this state, the inside of second housing portion 526 is set to a positive pressure by using a pressure pump via pressure-increasing port 1023 and pressure-increasing channel 1024. This enables the liquid stored in second housing portion 526 to move to first housing portion 221 of first channel unit $10A_{14}$.

As described above, Embodiment 10 enables suitable movement of fluids by adjusting the atmospheric pressure inside second housing portion 526, as well as by switching between the first state and the second state.

The fluid handling method according to Embodiment 10 is not limited to the above described mode. For example, three or more liquids may be mixed. PCR reaction may be performed by setting the insides of first housing portions to different temperatures, and then moving fluids between the first housing portions that have different temperatures. Fluid handling device 1000 according to Embodiment 10 may be, for example, suitably used for extraction and purification of DNA, and the like.

(Effect)

Channel chip 1010, fluid handling device 1010 and the fluid handling method according to Embodiment 10 have the effects the same as in Embodiment 1. In addition, fluids can be suitably moved in accordance with the atmospheric pressure inside second housing portion 526 in Embodiment 10.

Embodiment 11

Figure 27A:
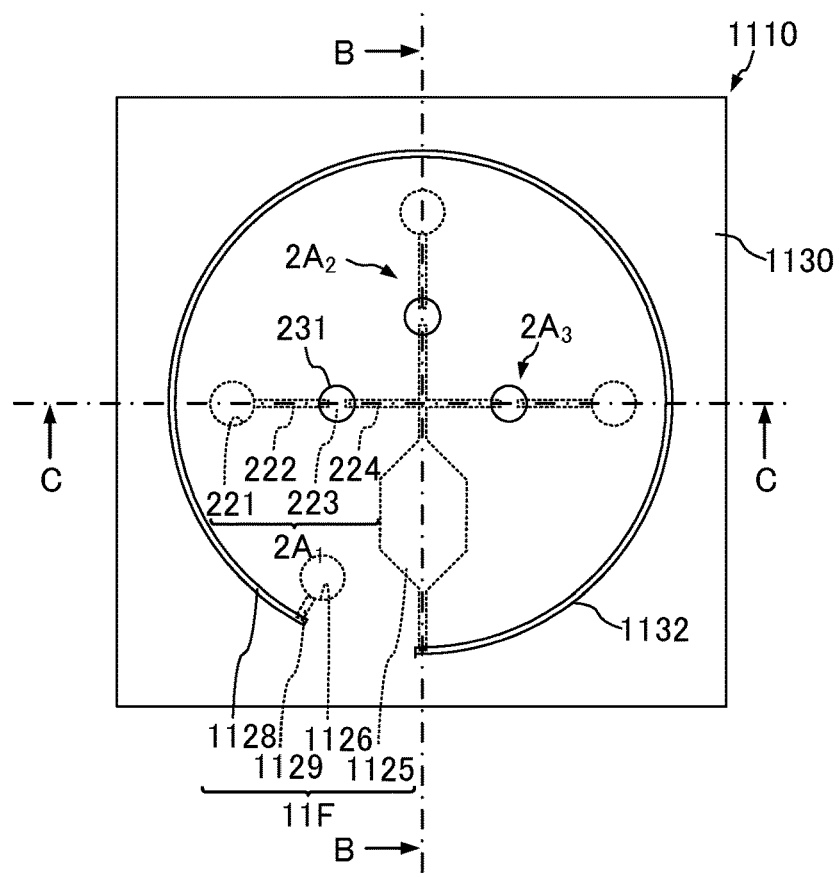
FIGS. 27A to 27C illustrate a configuration of a channel chip according to Embodiment 11.
Figure 27B:
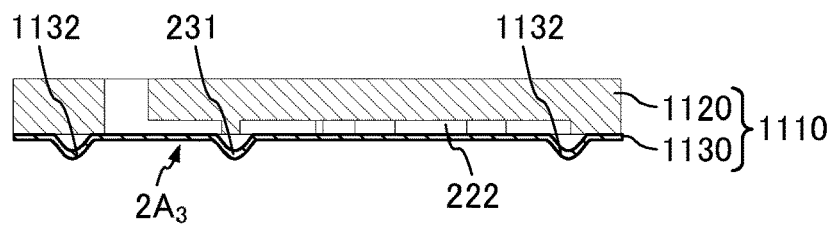
Figure 27C:
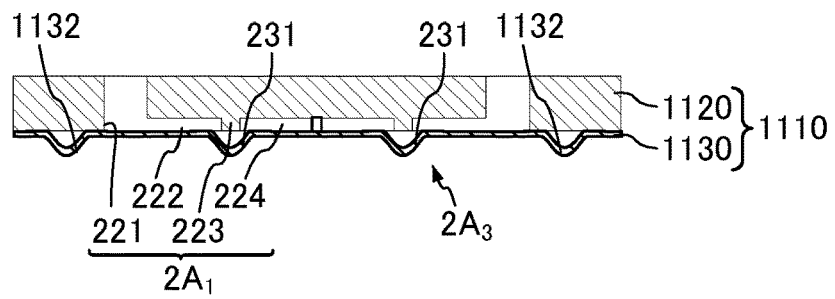

FIGS. 27A to 27C illustrate a configuration of channel chip 1110 according to Embodiment 11. FIG. 27A is a bottom view of channel chip 1110, FIG. 27B is a cross-sectional view taken along line B-B in FIG. 27A, and FIG. 27C is a cross-sectional view taken along line C-C in FIG. 27A.

A fluid handling device according to Embodiment 11 includes channel chip 1110 and a rotary member (not illustrated). Some of the components of the fluid handling device according to Embodiment 11 are the same as those of fluid handling device 200 according to Embodiment 2. Therefore, the same reference numerals are given to the components the same as those of fluid handling device 200 according to Embodiment 2, and the descriptions thereof will be omitted.

Channel chip 1110 includes substrate 1120 and film 1130. Substrate 1120 has a groove and/or through hole formed therein as appropriate within a range that can obtain the effect of the present embodiment. The thickness and example materials of substrate 1120 are the same as those of substrate 120 according to Embodiment 1.

Film 1130 includes three diaphragms 231 and one diaphragm 1132 for pumping. Film 1130 is the same as film 230 in Embodiment 2 except that film 1130 further includes diaphragm 1132 for pumping.

Diaphragm 1132 for pumping, which is a portion of film 1130, protrudes away from substrate 1120, and is not joined to substrate 1120. Diaphragm 1132 for pumping is bendable toward substrate 1120 when pressed by a protrusion for pumping (described below) formed on a rotary member according to Embodiment 11.

Diaphragm 1132 for pumping functions, along with the protrusion for pumping, as a pump for moving a fluid in a channel of the fluid handling device according to Embodiment 11. Specifically, while the protrusion for pumping presses film 1130, the protrusion for pumping is moved along the extending direction of diaphragm 1132 for pumping so that a part of diaphragm 1132 for pumping adheres to the surface of substrate 1120. This movement changes the atmospheric pressure inside the channel, thereby moving the fluid.

The cross-sectional shape and the shape in plan view of diaphragm 1132 for pumping are not limited as long as the above function can be achieved. For example, the cross-sectional shape (i.e., a shape on the cross section orthogonal to the flow direction of a fluid) of diaphragm 1132 for pumping is semicircular. Diaphragm 1132 for pumping is, for example, in the shape of an arc in plan view when channel chip 1110 is viewed from the bottom.

The distance (maximum distance) between diaphragm 1132 for pumping and substrate 1120 may be adjusted as appropriate, for example, from the view point of the flow rate of a desired fluid, and how well diaphragm 1132 for pumping can adhere to substrate 1110. A longer distance enables a more amount of a fluid moving through the gap between diaphragm 1132 for pumping and substrate 1120, and a shorter distance enables easier adhesion of diaphragm 1132 for pumping to substrate 1120.

Channel chip 1110 includes channels for running a fluid therethrough, such as a reagent, liquid sample, gas or powder. More specifically, channel chip 1110 includes three first channel units 2A$_1$ to 2A$_3$ and one fifth channel unit 11F.

Fifth channel unit 11F includes third channel 1125, fifth channel 1128, sixth channel 1129, and second housing portion 1126. Channel chip 1110 is the same as channel chip 210 according to Embodiment 2 except that channel chip 1110 further includes fifth channel unit 11F.

Third channel 1125 allows a fluid to move therein. The upstream end of third channel 1125 is connected to the downstream ends of second channels 224 in respective three first channel units 2A$_1$ to 2A$_3$. The downstream end of third channel 1125 is connected to the upstream end of fifth channel 1128. The cross-sectional area and cross-sectional shape of third channel 1125 are the same as those of first channel 122*a* according to Embodiment 1, respectively. In the present embodiment, third channel 1125 includes a widened part having a larger cross-sectional area than other parts of third channel 1125. The cross-sectional area of the widened part is not limited, and may be adjusted in accordance with the use.

Fifth channel 1128 allows a fluid to move therein. The upstream end of fifth channel 1128 is connected to the downstream end of third channel 1125. The downstream end of fifth channel 1128 is connected to the upstream end of sixth channel 1129. Fifth channel 1128 is a space formed between substrate 1120 and diaphragm 1132 for pumping.

The cross-sectional area and cross-sectional shape of fifth channel 1128 may be determined in accordance with the shape and size of diaphragm 1132 for pumping.

Sixth channel 1129 allows a fluid to move therein. The upstream end of sixth channel 1129 is connected to the downstream end of fifth channel 1128. The downstream end of sixth channel 1129 is connected to second housing portion 1126. In the present embodiment, sixth channel 1129 may be composed of a groove formed in substrate 1120 and film 1130 blocking the opening of the groove. The cross-sectional area and cross-sectional shape of sixth channel 1129 are the same as those of first channel 122*a* according to Embodiment 1, respectively.

Second housing portion 1126 is, except for the position thereof in the fluid handling device according to Embodiment 11, the same as second housing portion 526 in Embodiment 5.

The rotary member according to Embodiment 11 includes protrusion 261 and the protrusion for pumping. The rotary member may have any configuration within a range that can obtain the effect of the present embodiment, and may be appropriately designed as necessary. For example, the rotary member according to Embodiment 11 may be composed of a first member including protrusion 261, and a second member including the protrusion for pumping, or composed of one member including protrusion 261 and the protrusion for pumping. When the rotary member is composed of two members (the first and second members), the two members may rotate in coordination, or may independently rotate.

The protrusion for pumping is disposed on the underside (bottom surface) of the rotary member according to Embodiment 11. The shape, size and position of the protrusion for pumping are not limited, as long as the protrusion for pumping can contact film 1130 so that a part of diaphragm 1132 for pumping adheres to substrate 1120. Examples of the shapes of the protrusion for pumping include shapes of cylinders and polygonal prisms. For suitably adhering diaphragm 1132 for pumping to substrate 1120, the width of a surface where the protrusion for pumping contacts film 1130 is preferably longer than the width of diaphragm 1132 for pumping in the width direction of diaphragm 1132 for pumping (direction perpendicular to the fluid flow direction).

The rotary member may have a handle for gripping the rotary member as necessary. The rotary member may be held by a positioning section for positioning the rotary member so that the rotary member can rotate.

A fluid handling method according to Embodiment 11 is the same as the fluid handling method according to Embodiment 2 except that a fluid is moved by using diaphragm 1132 for pumping. For example, when one of the microvalves of respective first channel units 2A$_1$ to 2A$_3$ is in the first state, the method of Embodiment 11 moves the protrusion for pumping along the extending direction of diaphragm 1132 for pumping while the protrusion for pumping contacts film 1130 so that a part of diaphragm 1132 for pumping adheres to substrate 1110. This enables suitable movement of a fluid between first housing portion 221 and second housing portion 1126. The fluid may move from first housing portion 221 to second housing portion 1126, and vice versa. Where the fluid moves to is determined in accordance with the moving direction of the protrusion for pumping.

(Effect)

Channel chip 1110, the fluid handling device and the fluid handling method according to Embodiment 11 have the effects the same as in Embodiment 2. In addition, there is no need to independently prepare a pump for sending liquid in Embodiment 11.

The channel chip according to the present invention is not limited to the above described mode. The channel chip may be, for example, hydrophilized as necessary. For example, the inner surfaces of the first housing portion and the first channel may be hydrophilized. Such treatment enables the movement of a liquid stored in the first housing portion by capillarity, thereby filling the first channel with the liquid. As a result, entering of air bubbles into the channel can be prevented in the subsequent steps. Any method may be selected from methods known in the art as appropriate for hydrophilizing.

INDUSTRIAL APPLICABILITY

The fluid handling device of the present invention is particularly advantageous, for example, as a microchannel chip used in a medical field.

REFERENCE SIGNS LIST

10 Fluid
100, 200, 500, 700, 900, 1000 Fluid handling device
110, 210, 310, 410, 510, 710, 810, 910, 1010, 1110 Channel chip
120, 220, 320, 420, 520, 720, 820, 1020, 1120 Substrate
121$a$, 121$b$ Fluid inlet
221 First housing portion
122$a$, 122$b$, 222 First channel
123$a$, 123$b$, 223 (First) Partition wall
124, 224 Second channel
125$a$, 125$b$ Second partition wall
126$a$, 126$b$, 225, 325, 425, 1125 Third channel
226, 526, 1126 Second housing portion
127$a$, 127$b$ Fluid outlet
827 Fourth channel
1128 Fifth channel
1129 Sixth channel
130, 230, 430, 530, 730, 830, 1030, 1130 (First) Film
131$a$ to 131$d$, 231, 431, 531, 731, 831, 1031 Diaphragm
1132 Diaphragm for pumping
140 Positioning section
141 Step
150 Second film
160, 260, 560, 660, 760, 960 Rotary member
161$a$, 161$b$, 261, 561, 661 Protrusion
761$a$ First protrusion
761$b$ Second protrusion
162, 262, 562$a$ to 562$f$, 662$a$ to 662$c$, 762$a$ to 762$e$ Notch
163 Handle
963 Second electrode
940 First electrode
1070 Cover
$2A_1$ to $2A_3$, $3A_1$ to $3A_3$, $4A_1$ to $4A_3$, $5A_4$, $7A_4$, $10A_1$ to $10A_{14}$ First channel unit
2B, 3B, 4B Second channel unit
$8C_1$ to $8C_3$ Third channel unit
10D Pressure-reducing unit
1021 Pressure-reducing port
1022 Pressure-reducing channel
10E Pressure-increasing unit
1023 Pressure-increasing port
1024 Pressure-increasing channel
11F Fifth channel unit

The invention claimed is:

1. A channel chip having a channel in which fluid flows the channel chip comprising:
a substrate including a first channel, a second channel and a partition wall formed between the first channel and the second channel;
a film including a diaphragm having a substantially spherical crown shape, the film being disposed on the substrate so that the diaphragm faces the partition wall;
a positioning section for holding a sliding member in such a way that the sliding member is slidable on the film while the positioning section positions the sliding member, the positioning section being disposed on the film; and
wherein the sliding member, slidable on the film while contacting the film, opens and closes the channel by sliding on the film to move the diaphragm away from and against the partition wall.

2. The channel chip according to claim 1, wherein the sliding member is a rotary member which is rotatable.

3. The channel chip according to claim 1, wherein the positioning section is a frame for holding the sliding member in such a way that the sliding member is slidable on the film.

* * * * *